(12) United States Patent
Bimm et al.

(10) Patent No.: US 6,901,440 B1
(45) Date of Patent: May 31, 2005

(54) SYSTEM AND METHOD FOR UNIVERSAL SERVICE ACTIVATION

(75) Inventors: Mike Steven Bimm, Fair Oaks, CA (US); Douglas Patrick Clark, Tinton Falls, NJ (US); Steven John Kleinbach, Granite Bay, CA (US); Daniel Charles Tory, Granite Bay, CA (US); Randall David Custeau, Hamilton, CA (US); Robert Joseph Russell, Ashburn, VA (US); Yueqiang Cai, Mississauga (CA)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/347,112

(22) Filed: Jul. 2, 1999

(51) Int. Cl.[7] .............................................. G06F 15/173
(52) U.S. Cl. ........................ 709/223; 709/225; 709/226; 709/202; 370/352
(58) Field of Search ............................... 709/223, 225, 709/226, 202; 370/352

(56) References Cited

U.S. PATENT DOCUMENTS

| | | | | |
|---|---|---|---|---|
| 5,812,533 A | * | 9/1998 | Cox et al. .................... | 370/259 |
| 5,987,513 A | * | 11/1999 | Prithviraj et al. ........... | 709/223 |
| 6,330,598 B1 | * | 12/2001 | Beckwith et al. ........... | 709/223 |
| 6,335,927 B1 | * | 1/2002 | Elliot et al. .................. | 370/352 |
| 6,363,411 B1 | * | 3/2002 | Dungan et al. .............. | 709/202 |
| 6,363,421 B2 | * | 3/2002 | Barker et al. ............... | 709/223 |
| 6,400,689 B1 | * | 6/2002 | Sato et al. ................... | 370/342 |

* cited by examiner

Primary Examiner—Jack B. Harvey
Assistant Examiner—Adnan M Mirza

(57) ABSTRACT

The present invention provides a scalable, high-performance universal service activation system and method for activating service(s) on a network management system/EMS or other information management system with universal or generic informational changes entered in a service provisioning system(s). The invention is particularly useful in describing and initiating the activation of telecommunications and data communications network services in a vendor neutral manner, but can be employed to advantage for providing universal service activation for any industry and independent of technology. The inventive system and method incorporates object behavior concepts with the existing network management approach to create an EMS/NMS/OSS that significantly reduces the human effort to integrate network element configuration and provisioning for new and modified network elements. The SMS/NMS/OSS provides an object behavior model which is generally populated using different means, including a manually generated table, spreadsheet or file. The SMS/NMS/OSS provides a domain manager for generic method processing. The SMS/NMS/OSS domain manager provides a means to rollback or remove an implemented change if the change is canceled or unsuccessfully implemented. The SMS/NMS/OSS provides an object builder to connect the object through drag and drop component connections and export them visually to present the object architecture using standard software graphics tools. The SMS/NMS/EMS/OSS provides means to modify object behavior in an operational system without the need to stop, reset, reinitialize, recompile the SMS/NMS/EMS/OSS components or modules. This yields a SMS/NMS/EMS/OSS that has less risk of human error, requires less time to operate, costs less, and does not interrupt an functioning network system.

75 Claims, 11 Drawing Sheets

FIG. 3B

| LAYERS/ ASPECTS | FAULT (F) | CONFIGURATION (C) | ACCOUNTING (A) | PERFORMANCE (P) | SECURITY (S) |
|---|---|---|---|---|---|
| BUSINESS 162 | RAS QUALITY ASSURANCE | INSTALLATION PROVISIONING STATUS AND CONTROL | USAGE MANAGEMENT | PERFORMANCE QUALITY ASSURANCE | DETECTION CONTAINMENT AND RECOVERY SECURITY ADMINISTRATION |
| SERVICE 164 | ALARM SURVEILLANCE FAULT LOCALIZATION FAULT CORRECTION | | | PERFORMANCE MONITORING PERFORMANCE MANAGEMENT CONTROL | |
| NETWORK 166 | | | | | |
| NETWORK ELEMENT | TESTING | | | PERFORMANCE ANALYSIS | |

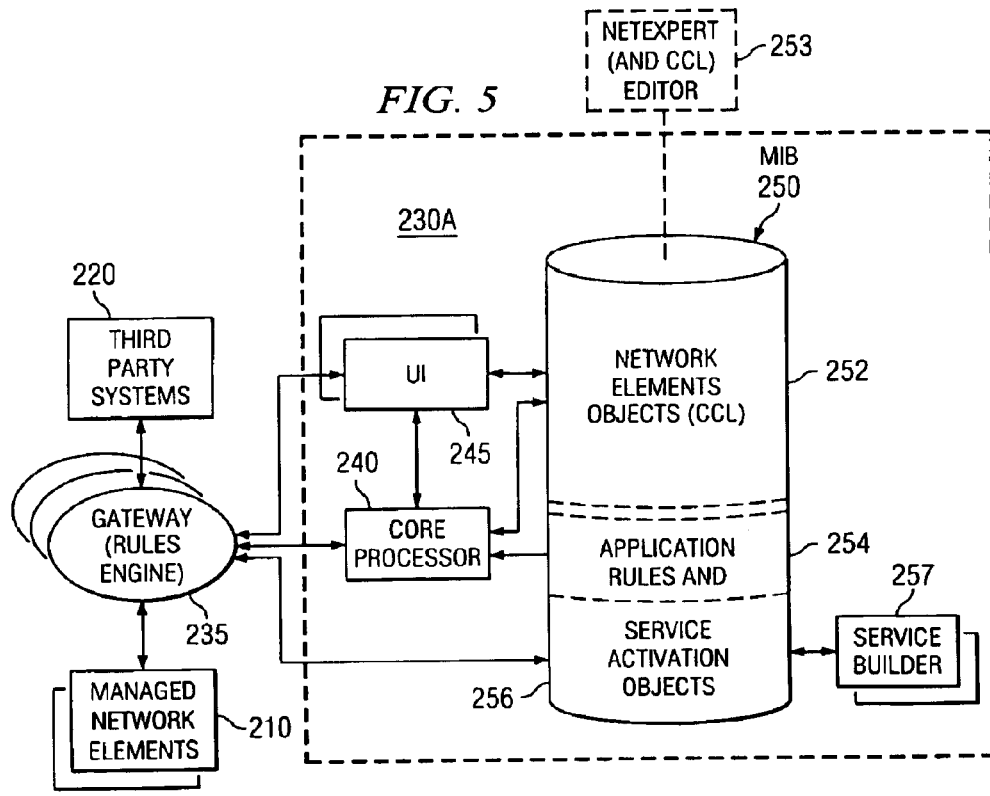

FIG. 5

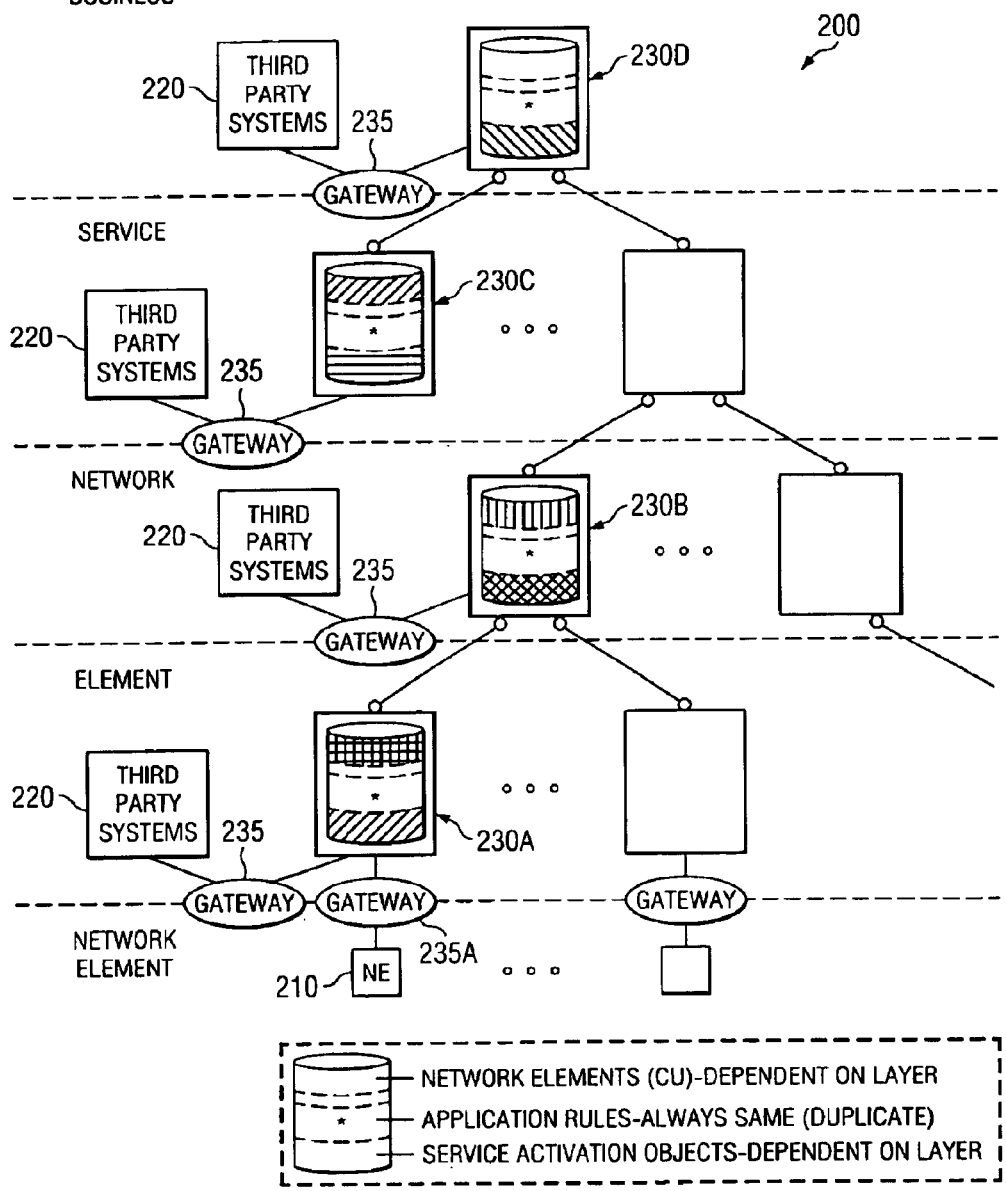

SYSTEM AND METHOD FOR UNIVERSAL SERVICE ACTIVATION

TECHNICAL FIELD

The present invention relates to the field of information and resource management and, in particular, to a system and method for providing an universal (or generic) service activation on an automated integrated telecommunications and data communications network.

BACKGROUND

The information-communication industry is currently undergoing tremendous change from the constant evolution of new technologies and changing market conditions. As a result, information service providers such as telephone, cable, wireless carriers, Internet Service Providers and utility companies all have the need to rapidly deploy new systems and system elements and alter their existing management systems to accommodate evolving business and network requirements. These requirements include the ability to integrate existing network equipment and systems with new elements and applications, customize existing systems and applications, and scale systems to accommodate growing networks and traffic volumes.

Network management and operations become crucial to the competitiveness of communication companies, utilities, banks and other companies operating Wide Area Networks (WANs) of computer devices and other network types and devices including SONET, Wireline, Mobile etc. Many companies currently use customized "legacy" network management systems (NMSs) and operations support systems (OSSs) that are based on older technologies, which poorly integrate disparate network elements and associated Element Management Systems (EMSs). Still others use EMSs, NMSs and OSSs that are not scalable, cannot be easily interfaced with disparate network elements, and require costly programming while offering limited features and flexibility.

The assignee of the present invention currently produces a Framework VSM which is operationally and network focused and is primarily used in the development of EMS's and NMS's sold under the trademark NetExpert®. NetExpert is an object-oriented system that is comprised of a set of integrated software modules and graphical user interface (GUI) development tools that permit the creation and deployment of network management and operations support solutions. Each element type, device, device component, and even database may be managed as a separate "object." However, NetExpert, like other EMS/NMSs/OSSs on the market today, still may require specific customization for each managed object.

Each element type, device, and as well as other managed objects requires a separate set of rules to be tailored to the nature of the object, its specific hardware and software, and the business practices of the company. Each rule set provides the details for the management of the particular object to which the rules are directed. NetExpert's Fourth Generation Language (4GL) editors permit this customization to be performed by subject matter experts (SMEs). They use their knowledge to create simple sets of rules such as "if-then" statements to manage their Network Elements, EMs or NMSs, rather than requiring skilled programmers to integrate devices and other elements with additional computer software code such as C and/or C++. However, rule-set development is labor and time intensive, as well as subject to human error and expense.

EMS/NMSs can manage a wide range of communications and computer devices, from switches, DCS, SONET ADM's, routers, testing devices, video units, banking ATM machines, air traffic control systems, and for example, other computerized devices, databases and objects. OSSs provide a broader layer of functionality to directly support the daily operation of the network, such as order negotiation, order processing, line assignment, line testing and billing. EMS/NMSs can be a component of a larger OSS system. However, for the sake of simplicity, but not limitation, the communication switching network context will be used throughout this application.

Each device, for example a switch, has available or responds to certain information relating to its operation, such as performance, fault, configuration, and inventory. For each device, the correlation of operational functions with service activation information is a labor intensive effort that is typically performed by a skilled programmer. If an equipment provider develops and markets a new switch, typically a skilled programmer has to identify and analyze all of the service activation information for that switch. The programmer then correlates that information with all of the functionalities that a customer may desire to use in connection with that switch, and then modifies its existing EMS/NMS/OSS program code to manage that switch.

The present assignee's network management and operations support framework, NetExpert, currently uses a high level language to permit non-programmers to write instructions, referred to as rule sets, to manage or route information within NetExpert, between NetExpert systems, or between NetExpert and other programs and functions, without the cost and complexity of other EMS/NMSs/OSSs. For example, if a particular service activation is sent to the switch, one customer may want to activate the service with alarms generated, while a second customer may only want to have alarms disable prior to testing then have alarms activated at a later time. Even with NetExpert, these rules have to be entered through 4GL editors. Although SMEs have better knowledge of the business practices of the customer, and the rules can be more easily crafted with NetExpert, the time, cost and complexity of the EMS/NMS/OSS development and maintenance is still significant.

While this invention relates to any SMS/NMS/EMS/OSS, it will be described in reference to the NetExpert system to provide a concrete example of a SMS/NMS/EMS/OSS application.

Established and new service providers alike are struggling to manage the scale and diversity of their network elements. IP/data services and other telecommunications networks can involve a million or more SNMP-enabled elements—ATM switches, routers, bridges, voice-mail systems, gateways, modems, and set-top boxes as well as SONET, DCS's, circuit based and mobile switches. Until now, service providers haven't had an effective system for mapping services to this diverse element base. The traditional service activation architecture is to build rules or algorithms that perform the activation at the element level. These algorithms are typically written in a programming language and compiled into a service activation application. The hard-coding of rules in service activation system requires tremendous resources for the development and support of EMSs/NMSs and OSSs and is inefficient in a rapidly changing communications environment. The higher the level of the TMN business model, the more human effort and cost is likely to be incurred in delivering the functionally required by the end user.

SMS/NMS/EMS/OSS must provide to the user: system scalability, which is the ability to continually describe and initiate existing and new network services across scalable networks, as well as flexibility to incorporate business rules down to location/device level granularity in a generic manner, which is the ability to support a wide range of customer network services, while maintaining simplicity, efficiency and low cost.

Consequently, what is needed is an efficient service activation system that reduces overhead demands on network management system resources. The service activation method should also be adaptable enough to configure specific network services during runtime with no downtime and readily extendable to a variety of vendor devices or management protocols without undue administrative or maintenance effort.

SUMMARY OF THE INVENTION

The present invention provides a system and method for activating a service(s) on a target network management system or other information management system with universal or generic informational changes entered in a service provisioning system(s). The universal service activation architecture of the present invention may be used to provide an effective universal service activation system and method for mapping services to a diverse element base having particular attributes. The present invention provides an universal service activation system and method that uses object network(s) (essentially a logical decision tree) based activation and translation process to support generic inputs instead of vendor/device specific inputs by employing a set of templates to enable generic description of a service order.

The universal service activation system and method is preferably scalable, flexible, and configurable. The system and method of the present invention generally reduces the complexity in formatting service orders by surface generic representations of services and actions for various technology domains (ATM, SONET, SDH, PDH, circuit/mobile switching, IP, AIN, etc.) while minimizing overhead demands on network management system. The universal service activation architecture provides an automated activation system and method that reduces the time required to activate services and reduces administrative and training burdens on organizations by service generic service and actions.

The inventive system and method incorporates object behavior concepts with the existing network management approach to create a SMS/NMS/EMS/OSS that significantly reduces the human effort to integrate network element configuration and provisioning for new and modified network elements. The EMS/NMS/OSS provides an object behavior model which is generally populated using a manually generated table, spreadsheet, GUI or file. The SMS/NMS/OSS provides a domain manager for generic method processing. The SMS/NMS/OSS domain manager provides a means to rollback or remove an implemented change if the change is canceled or unsuccessfully implemented as well as scheduling and dependency resolution. The SMS/NMS/OSS provides an service builder to connect the object through drag and drop component connections and export them visually to present the object architecture using standard software graphics tools. The SMS/NMS/OSS provides means to modify object behavior in an operational system without the need to stop, reset, reinitialize, recompile the SMS/NMS/EMS/OSS components or modules. This yields a SMS/NMS/EMS/OSS that has less risk of human error, requires less time to place into operation, costs less, and does not interrupt an operating network system.

The present invention provides a scalable, high-performance universal service activation system and method for activating service(s) on a network element, element management system, network management system or other information management system with universal or generic informational changes entered in a service provisioning system(s). The invention is particularly useful in describing and initiating the activation of telecommunications and data communications network services in a vendor neutral manner, but can be employed to advantage for providing universal service activation for any industry and independent of technology.

Universal (or Generic) Service Activation is a process of describing and initiating and providing status for the activation of telecommunications and data communications network services in a vendor neutral manner. This is achieved by creating universal service components. A service component is a method of packaging the parameters and values that characterize a service into a well defined data structure used to compose a service order.

In a preferred embodiment of the present invention, an universal service component defines an interface between segments of a service activation architecture. A universal service activation system comprises: a service provisioning system(s) and an activation system. The activation system further comprises: an order repository; an order processor/order management system; a peer manager, domain manager (s); and element management system(s).

Service Provisioning refers to the one or more systems that drive the activation process. These systems are "above" the activation system in the architecture. For example, Service Provisioning primarily means the order entry/or network design tool.

The universal service activation includes a service description process; a service translation process; and a service activation process. The service description process further enters a service into a service provisioning system(s) using an universal/generic service component(s); groups service component instances together to compose a service order and issues of the desired service order design to an activation system through a messaging interface. The service translation process routes generic service components to an appropriate domain manager(s); translates vendor/device neutral generic service component(s) into vendor/device specific terminology; decomposes service component (s) into element activation requests using object networks; and routes vendor/location specific parameters to the appropriate element management system(s). In a preferred embodiment, the service activation process may also initiate vendor/device specific events, deliver activation commands or data to network elements through an element management system(s) to enable the desired service and send status responses through the activation system and the messaging interface to the service provisioning system(s).

As those skilled in the art recognize, a variety of combinations of different steps may be devised to utilize the system and method of the present invention employing the universal service activation architecture to provide system scalability, as well as flexibility to incorporate business rules down to location/device level granularity in a generic manner, while maintaining simplicity, efficiency and low cost.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3B shows a table, which includes the management layers of FIG. 3A and associated functional groups.

FIG. 4 depicts one embodiment of an SMS/NMS/EMS/OSS for managing a network employing the Universal Service Activation Architecture of the present invention.

FIG. 5 shows a one embodiment of a management processor for implementing a NMS/EMS/OSS.

DETAILED DESCRIPTION OF THE PREFERRED EMBODIMENTS

A system and method for an Universal Service Activation on an automated integrated telecommunication network management system is provided in accordance with the present invention. While this invention relates to any SMS/NMS/EMS/OSS, it will be described in reference to the present assignee's CM Exel™ system to provide a concrete example of a SMS/NMS/EMS/OSS application. The Universal Service Activation System (USAS) may be best described in conjunction with a telecommunication management network (TMN) architecture showing functional components and entities depicted in FIGS. 1–6.

a. Overview

Figure 1:
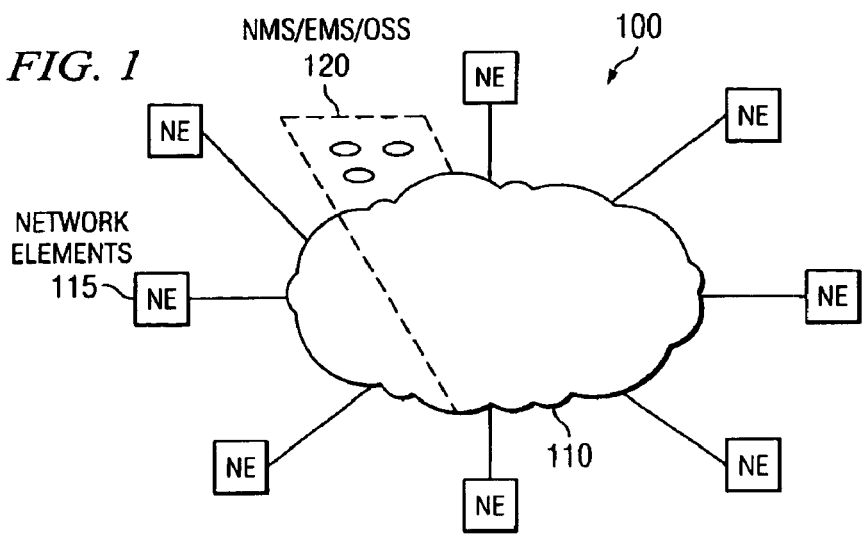
FIG. 1 is a functional depiction of the conceptual TMN relationship between NMS/EMS/OSS and the managed network.

One embodiment of the present invention provides a general network management solution that is based on the standard Telecommunication Network Management (TMN) architecture promulgated by the International Telecommunications Union. FIG. 1 functionally depicts the conceptual TMN relationship 100 between network management system (NMS) 120 and the managed network 110, which includes network elements (NEs) 115. FIG. 1 illustrates the overseeing nature of NMS 120. Network elements 115 correspond to the physical modules and systems (e.g., switches, termination points, databases, sub-networks) that are managed by NMS 120. One of the aspects of the TMN paradigm is that it promotes inter-operability between different components, systems, and networks within the managed "network" 110, regardless of their particular configurations and protocols. The present invention not only implements these TMN objectives, but also, provides an NMS (or at least NMS sub-systems) that have improved efficiency and scalability over existing management systems.

Figure 2:
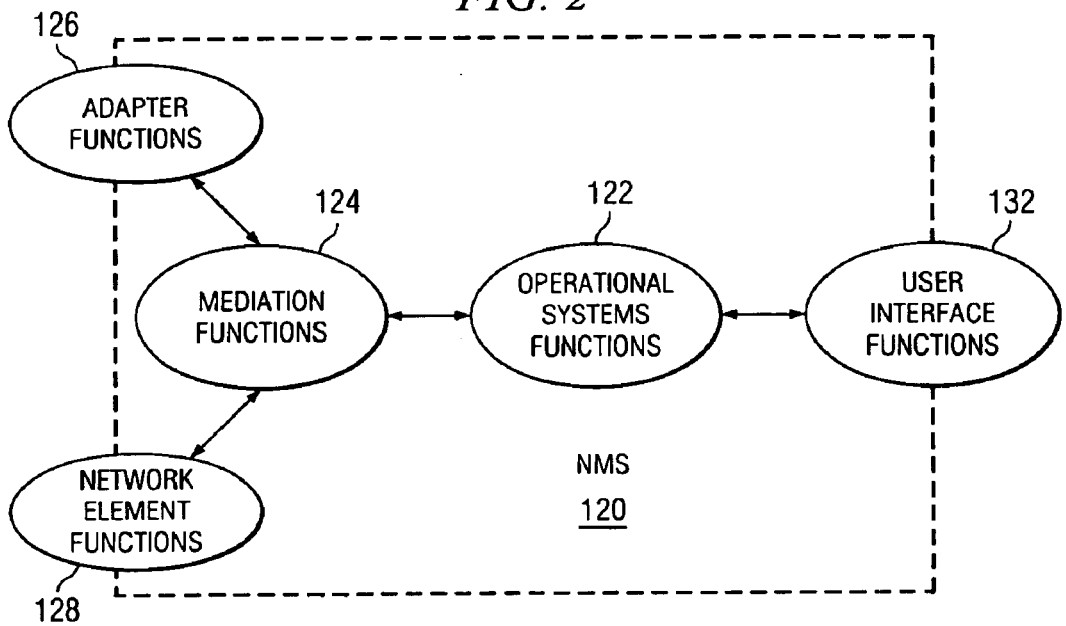
FIG. 2 shows a logical functional diagram of a NMS/EMS/OSS consistent with the TMN standard.

FIG. 2 shows a logical functional diagram of a network management system 120 consistent with the TMN standard. NMS 120 includes operational systems functions 122, mediation functions 124, adaptor functions 126, network element functions 128, and user interface functions 132. Mediation functions 124 communicatively link operational systems functions 122, adaptor functions 126, and network element functions 128 between one another. User interface functions 132 are linked to operational systems functions 122.

Operations systems functions 122 correspond to functions that manage the NMS. It performs various activities including acquiring management information such as obtaining alarm information from managed network elements, performing the required information processing activities on the network (e.g., correlating alarms, implementing service requests), activation/modification/de-activation of service and directing the managed elements to take appropriate action such as performing a test. Mediation functions 124 perform functions for mediating communications between the various functional blocks. It includes resources for storing, filtering, and translating data in order for information to be in a suitable form for a receiving functional block. For example, a network element may require information from the NMS 120 to be packaged in various protocols such as X.25, Protocol 95, and BX.25. Adaptor functions 126 interface communications between the managed network 110 and third-party systems not necessarily managed by the NMS 120. Network element functions 128 correspond to the actual physical elements that make up the network 110. Activation requests (commands or information packets) corresponding to the actual managed network service are provided to the elements by the operations systems functions 122 via the mediation functions 124 in various manners. Finally, the user interface functions 132 provide to human users access to the operational systems functions 122. The adaptor, network element, and user interface functions are represented as being partially in and out of the NMS 120 because they are part of the system, but they also interface with the real physical world.

Figure 3A:
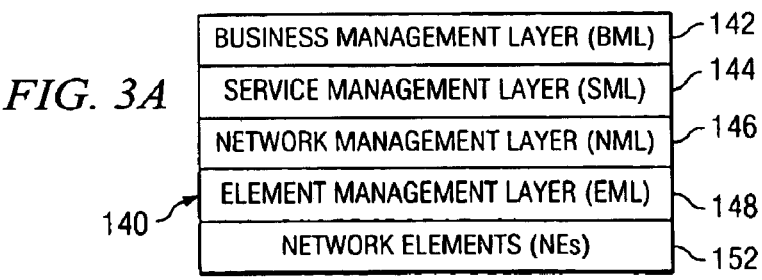
FIG. 3A is a TMN standard abstraction of four layers for managing a network through an NMS/EMS/OSS.

As shown in FIG. 3A with management layer 140, the TMN standard abstracts four different layers for managing a network through an NMS. These layers include business management layer 142, service management layer 144, network management layer 146, and element management layer 148. Also fit into this conceptual depiction is a network element layer 152, which interfaces between the physical network and the NMS 120 through the element layer 148. Network element layer 152 corresponds to (abstracts) the network element functions 128 from FIG. 2. The element layer 148 is the lowest layer in the model; it corresponds to (abstracts) the most fundamental aspects of the network including its physical components and systems. The next layer upward is the network layer 146. It generally corresponds to (abstracts) the network's higher-level components and interconnections. The next upward layer is the service layer 144. This layer generally corresponds to (abstracts) the nature of the services (e.g., number and type of ports, quality) provided to subscribers or clients of the network. (The term client is used broadly and covers any type of network client including clients within an Intranet or subscribers to a network service provider such as a telephone, wireless, cable, or Internet service provider, for example.) Finally, the business layer 142 corresponds to (abstracts) business areas of the network such as contract performance, and profit and loss centers.

The TMN architecture also articulates general functional groups that are to be managed across the various network management layers. These functional groups include fault, configuration, accounting, performance, and security. FIG. 3B shows table 160, which includes management layer rows (business layer 162, service layer 164, network layer 166, and element layer 168) and functional group columns (fault 172, configuration 174, accounting 176, performance 178, and security 182). The depicted functional categories, which are shown as applying to each layer, are derived from the TMN architecture (M.3200).

b. Network Management System

FIG. 4 shows one embodiment of a network management system (NMS) 200 for managing a network having managed network elements 210 and also linked to third-party systems 220. NMS 200 includes management processors 230A, 230B, 230C, and 230D for managing the element, network, service, and business layers, respectively. As shown in FIG. 4, service management processor 230C is communicatively interconnected between the network and business management processors 230B and 230D, respectively. Likewise, Network management processor 230B is interconnected between the element management processor 230A and the service management processor 230C. In addition, the element management processor 230A, which actually encompasses gateway 235A, is linked through gateway 235A to the managed network elements 210 for sending and receiving messages therefrom. Thus, the element management processor serves as the gateway for the NMS 200. Managed network elements (or network elements) 210 comprise the various elements of the managed network. Each management layer can have third-party systems 200 interfacing with respective layer management processor via an associated gateway 235.

Managed network elements 210 correspond to the network elements functions 128 and network elements 115 from FIGS. 2 and 1, respectively. Each managed element can receive and provides (either directly or through an element manager) messages that include pertinent information about a particular element. For example, a message for a switch could be an activation command that identifies the switch and requests that some portion thereof be placed into service. With numerous vendors supplying elements for a given network, messages can vary in form (e.g., different protocols such as X.25, HTP/IP, Ethernet, Serial Asynchronous (RS-232), TCP/IP, SNMP, CMIP) from one element to another. Accordingly, gateway 235A includes, among other things, a rule engine for composing outgoing messages and identifying, parsing and normalizing element responses. For USAS the request is received in a normalized (generic) format and it is mapped into vendor specific parameters. Normalizing involves translating (or mapping) the request into a suitable, consistent form (e.g., ASCII), which may be discernable within the entire NMS 200. Identifying and parsing involves identifying the requests destination and associated management level so that it may be processed in the correct management processor (i.e., element 230A, network 230B, service 230C, or business 230D). Most (but not all) of the messages sent to the network elements 210 will be element layer service requests because these messages correspond to components in the physical network "elements." However, service request messages are not exclusively sent to the physical network itself. Management processors 230 may also respond to service request messages from higher level layers and pass them downward to the corresponding element management processor. For example, a given switch vendor may provide a network/element management processor and as a result an activation system would be required to send service request messages to this network management processor, to be forwarded to the element management processor and eventually to the physical network "elements". This would correspond to a element/network layer function or issue. A number of physical network elements necessary for providing this service may be impacted. However, the elements themselves are not capable (or even in a position) to provide (activate) this service. Thus, the element and/or network management processors may determine, using an aggregate of element and/or network service request messages, how to activate the requested service on the physical network "elements". The management processors 230A, 230B, 230C, and 230D (discussed in greater detail below) process the messages to implement predetermined policies and objectives of the NMS 200, as defined by users such as designers and network managers.

FIG. 5 shows one embodiment of a management processor 230 for implementing a network management system (NMS) 200. The management processor 230 is communicatively linked to the network through managed network elements 210. It is also linked to third-party systems 220, which are connected to the managed network.

Management processor 230 generally includes gateway 235, server 240, user interface 245 and management information base (MIB) 250. In the depicted drawing, the gateway is connected to the managed network elements 210, third-party systems 220, server 240 and the MIB 250. (The depicted management processor 230 is actually an element management processor 230A with its physical interconnection to network elements 210 and third-party systems 220; however, the management processor 230 could generally apply for the other layers with its gateway 235 connected to its adjacent lower layer rather than to the network elements 210.) The user interface 245 is connected to gateway 235, server 240, and MIB 250 to provide a user with access to these modules. MIB 250 further includes a network model objects section 252, application rules section 254, and service activation objects section 256. MIB 250 also has network model objects editor 253 for editing the network model objects section 252 and a service builder editor 257 for editing the service activation objects and object networks section 256.

In addition to having parse and normalization functionality (as discussed above), gateway 235 generally includes a rule engine for adding new managed objects (MOs) that correspond to the parameters of the received universal service component activation request. The rules for implementing this rule engine may be fixed even as the managed network changes, e.g., is augmented or reconfigured. In one embodiment, the rule engine may use conventional hierarchical or relational search schemes for obtaining the service activation object(s). In another embodiment, it uses a variation on both of these schemes. In this embodiment, a flexibly configureable search scheme locates the object network (ON) based on attributes of the service activation objects (SAOs) (e.g., Service Name, Service Action, Vendor Name, Vendor Version, Network Element Name). In this manner, each incoming service component activation request is mapped to the activation request into specific element transactions through the use of service activation object(s) stored in NMS/OSS MIB 250.

Server 240 includes a processing (or rule) engine for performing tasks including advanced processing of service activation objects that are initiated from the derived, executing service order components as determined in the gateway 235. This processing is responsive to the service's parameters, as well as to the particular attributes associated with the derived and initiated service activation objects. Object processing in gateway 235 and server 240 carries out the predefined policies (or objectives) for activating services on the network responsive to the particular incoming generic component activation requests. It should be noted that gateway 235 may actually comprise numerous gateways distributed about the network. Thus, by having the basic processing occur in the gateway(s) 235, the overall processing (which includes basic and advanced processing) can be efficiently distributed both systematically and geographically rather than exclusively occurring at a centralized server 240.

User interface 245 may be any suitable device (or devices) such as a display terminal for providing users with interactive access to the management processor 230. In addition, the user interface may actually comprise a plurality of user interfaces depending upon the particular requirements of the managed network. For example, with an NMS having numerous gateways, numerous user interfaces 245 may be used to accommodate each gateway, along with the server 240.

MIB 250 is an information base for storing objects and rules for managing the network in response to incoming service orders and incidents. In one embodiment, MIB 250 comprises Network elements section 252, application rules section 254, and service activation objects section 256.

The network model objects section 252 stores network model objects, which are objects that correspond to the managed elements of the network and associated modules. (It should be noted that these managed elements can exist in any management layer and not simply the element layer.) These element objects contain attributes that reflect the state of the actual, physical element. Thus, the entirety of element objects within this section (for each of the management layers) model the network and enable the NMS 200 and individual management processor 230 to track and model the state of the managed network. (It should be recognized, however, that various embodiments of the present invention may not use or require complete or even partial network models.)

Figure 6:
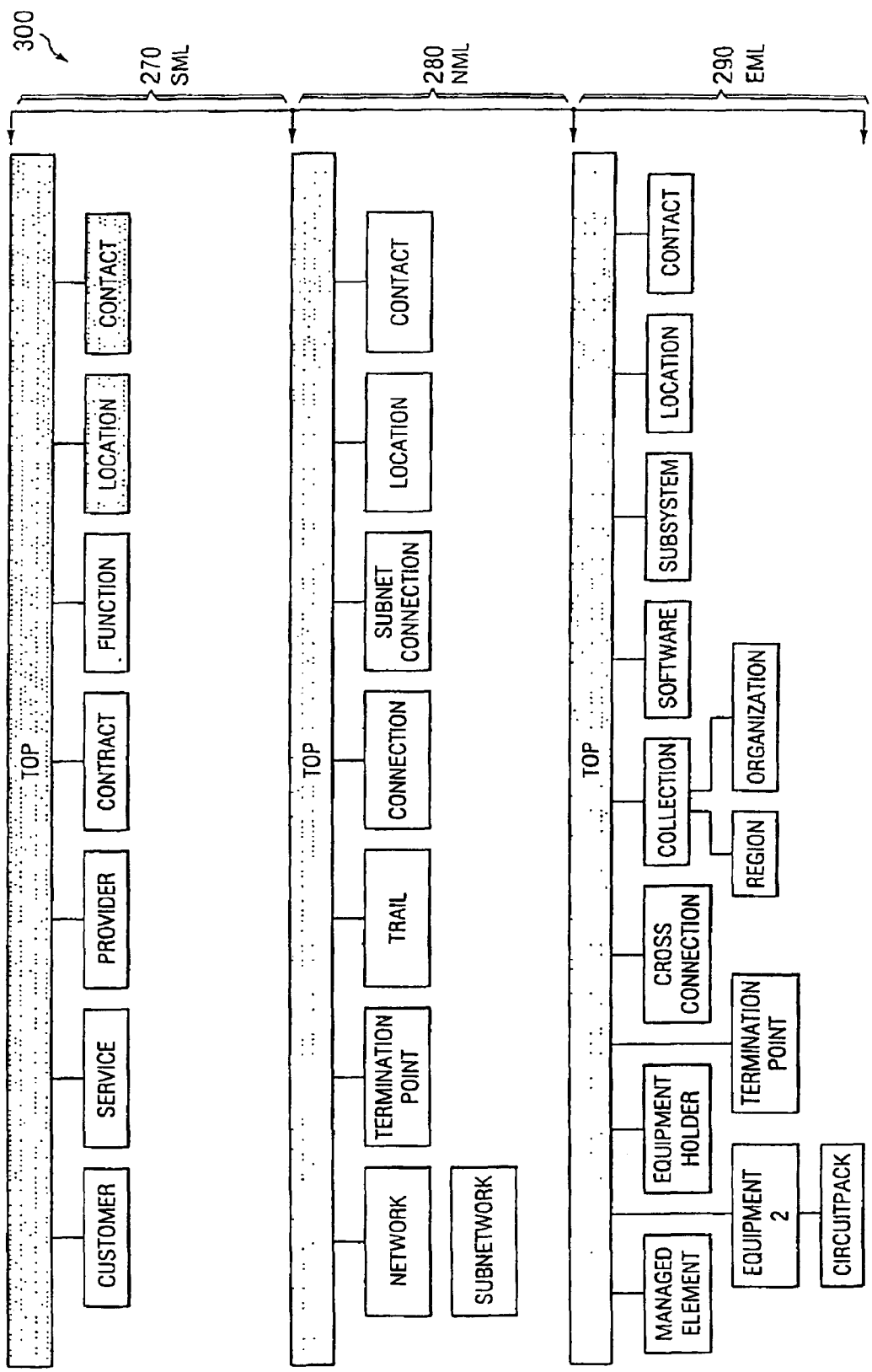
FIG. 6 illustrates one embodiment of a class tree for object classes within the element, network, and services layers.

FIG. 6 shows one embodiment of a class tree 300 for object classes within the element, network, and service layers. Class tree 300 includes service layer object classes 270, network layer object classes 280, and element layer object classes 290. The network model objects model and track the state of the network, which is useful in various EMS/NMS/SMS applications such as configuration management. As a result of service activation, the activation system can be configured to update this model to reflect the new state of the network. In addition, the network model objects maintain records for the managed elements and provide an interface model for conveying information (e.g., alarm status) through the user interface to a user.

A set of object class definitions that can be used by many software applications for the consistent, integrated management of telecommunications and/or data networks and services can be employed. An object class is a definition, or template for a software object that is used to represent physical or logical resources in a software application.

Telecommunications software applications often use objects to represent the networks and services they manage. There is also an extensive body of industry standards aimed at defining these objects, from such organizations as ITU-T, TI, ETSI, ATM Forum, TeleManagement Forum, SIF, etc. For example, most common industry standards have defined managed objects that are suitable for communication between software applications and the devices they manage. The object classes and attributes employed here in one embodiment of the present invention are derived from an extensive review of relevant standards and object classes including the one defined in ITU-T, the ATM Forum, SIF, TMF, and Telcordia™ Technologies (formerly Bellcore).

The application rules section 254 comprises reusable (generally applicable) application logic that interacts with the objects from the service activation objects section 256 on the one hand, and with the network model (formed by the network model objects section 252) on the other. Each unique processed service component will have different service activation objects, as well as network model objects, but will share this applications rule processing logic. These application rules may be common for the management processors in each of the management layers. Thus, in FIG. 6, the various network model and service activation objects sections are shaded differently, but the application rules sections have like shading.

Service Activation Objects include attribute and methods (or operations) for performing parameter/parameter value mapping, default support, mandatory/option support, logic events, value mapping events, etc.

Similarly, service builder 257 shown in FIG. 5, is used for adding/editing the service activation objects and object networks within the service activation object networks section 256. Service Activation objects are edited in order to change how incoming service components are processed so as to effectuate the objectives or policies of the management system, translate the service component into vendor specific terminology, and to activate the requested service on the network "elements." With the use of service activation objects, these policies, translations and "element" activation requests can be readily changed. Rather than having to modify a particular rule set or procedure for each possible service order, only high-level service activation objects need to be changed. These changes are then reflected for all incoming service components. This is but one benefit in using service activation objects for processing service components.

Figure 7:
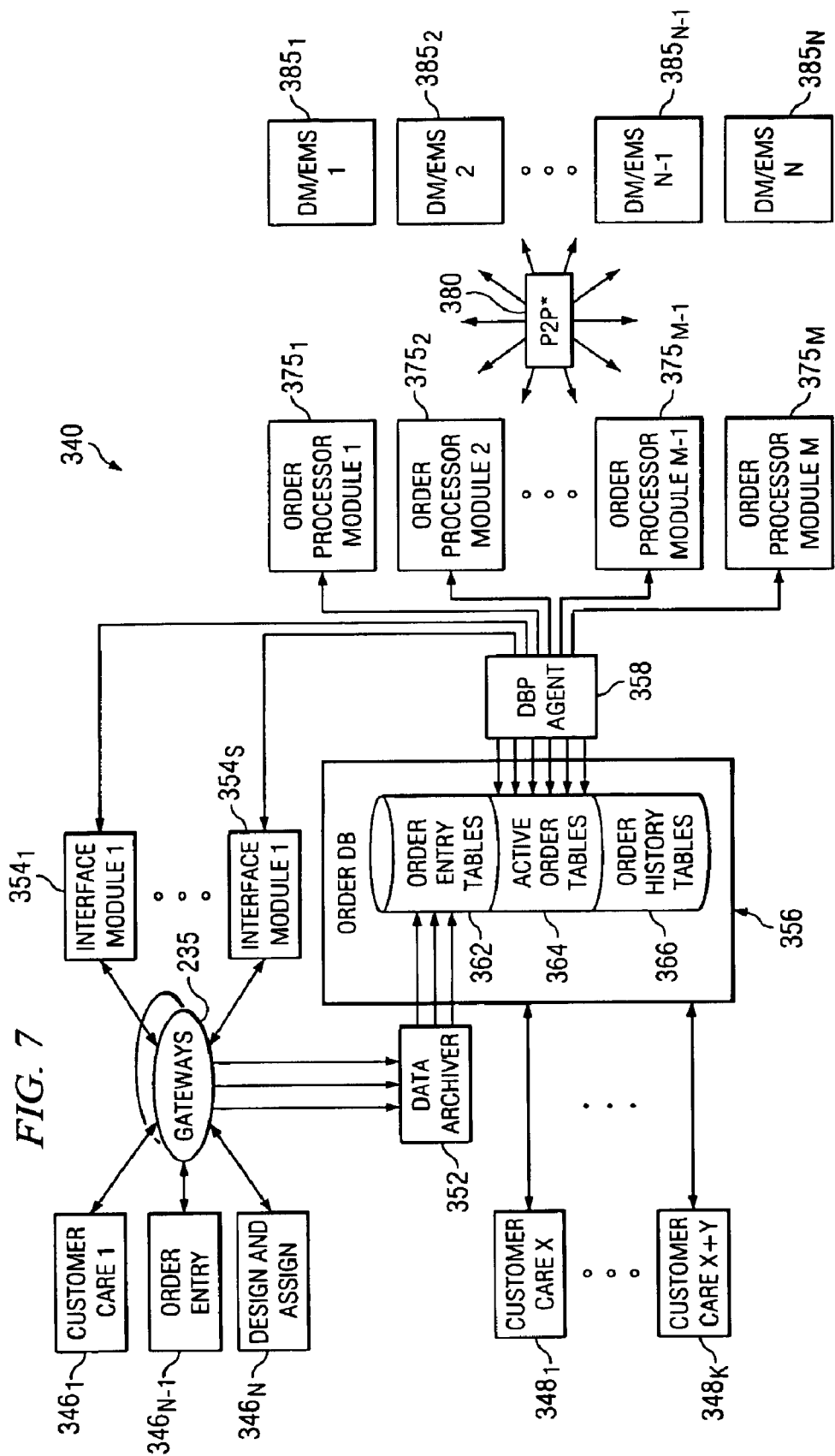
FIG. 7 depicts exemplary scalable Universal Service Activation Architecture.

FIG. 7 illustrates a scalable (ability to continually provision more services (number of orders)) Universal Service Activation Architecture 340. A variety of service related systems including, customer care $346_1$, order entry $346_{N-1}$, design and assign $346_N$ and other customer systems $348_1$ to $348_K$ may communicate either via gateways 235 and data archiver 352 combination, or through interfaces $354_1$ to $354_S$ or directly with order database 356. Order database 356 generally stores order entry tables 362, active order tables 364, and order history tables 366. Order database 250 preferably employs database agent 358 to interact with order processors $375_1$ to $375_M$. Order processors $375_1$ to $375_M$ preferably employ peer manager(s) 380 to communicate with domain manager(s) (DMs) and element management system(s) (EMSs) $385_1$ to $385_N$.

Figure 8:
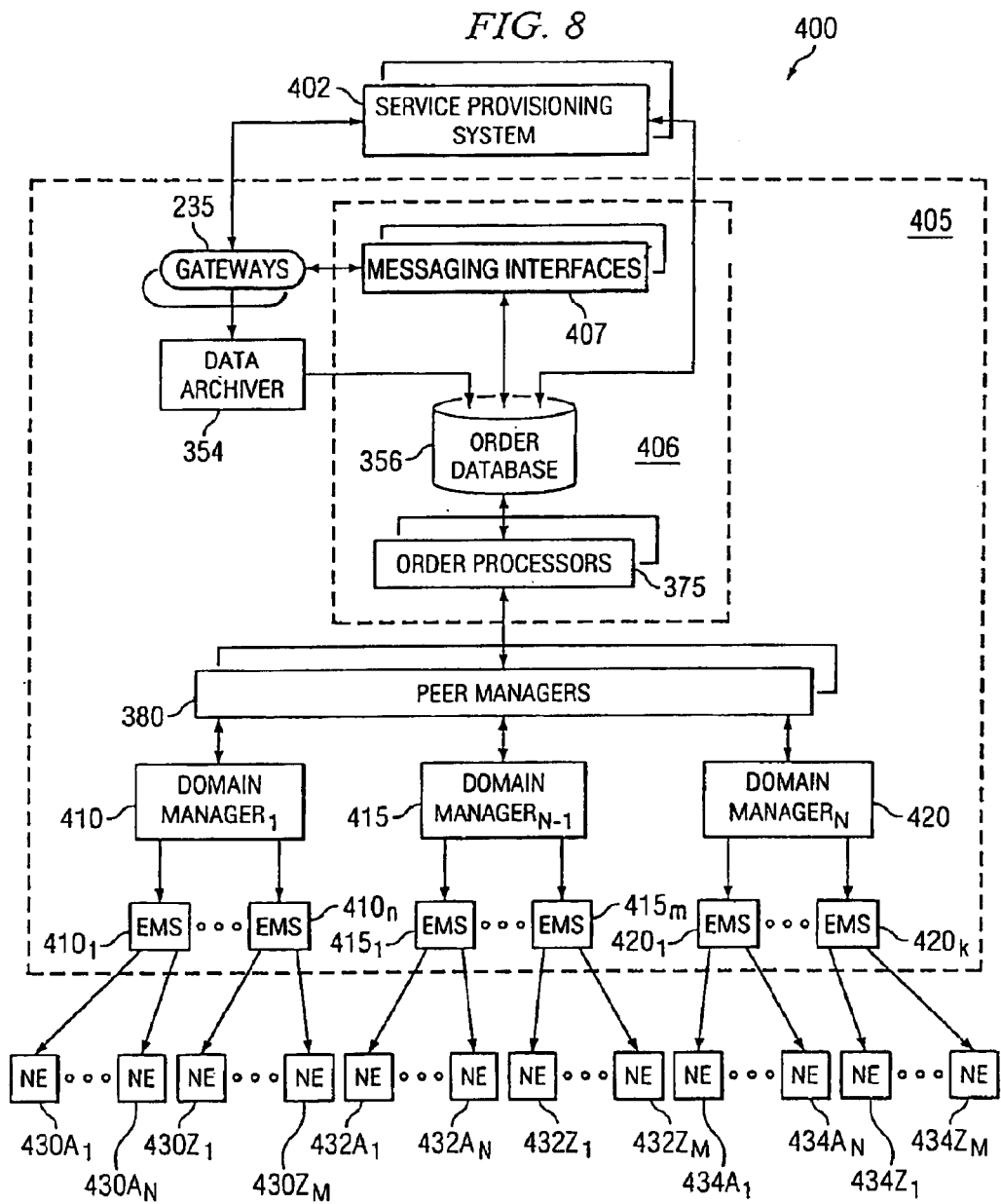
FIG. 8 is a block diagram of a one embodiment of Universal Service Activation Architecture of the present invention.

FIG. 8 depicts a preferred embodiment of the Universal Service Activation Architecture of FIG. 7 that uses artificial intelligence, more specifically, it uses expert system EMS/NMS/OSS 200 for implementing an Universal Service Activation System (USAS) 400 to automatically provision and activate desired/requested service components. Components of FIG. 8 that are similar to those in FIGS. 4, 5 and 7 have been labeled accordingly. The illustrated high-level graphical representation of FIG. 8 is preferably an open, layered operations architecture specifically designed to meet and exceed the architectural needs of large-scale, multi-service networks as they grow in both size and complexity. Universal Service Activation System (USAS) 400 generally includes a Service Provisioning System(s)(SPSs) 402 and an activation system 405 generally comprising, order processing system 406 having a messaging interface(s) 407, order database 356, order processor(s) 375, a peer manager(s) 380, gateway(s) 235, a data archiver 354, Domain Manager(s) (DMs) 410, 415, and 420, and Element Management System (s) (EMSs) $410_1$–$410_n$, $415_1$–$415_m$, and $420_1$–$420_k$ (The combined Domain Manager(s) and Element Management System(s) $385_1$–$385_N$ of FIG. 7 are shown separately.) In the depicted FIG. 8, the exemplary Element Management System(s) (EMSs) $410_1$–$410_n$, $415_1$–$415_m$, and $420_1$–$420_k$ with corresponding managed network elements $430A_1$–$430A_n$, $430Z_1$–$430Z_m$, $432A_1$–$432A_n$, $432Z_1$–$432Z_m$, and $434A_1$–$434A_n$, $434Z_1$–$434_m$, are shown respectively. The order processing system 406 preferably employs a Service Activation Server(s) (SAS) as order processors $375_1$ to $375_M$ substantially similar to the management processor 230 shown in FIG. 5. In other words, the activation system is comprised of service/network management system 200, server/rule engine 240, and inference base (management information base (MIB)) 250. Although USAS 400 is comprised of software machines stored and executed preferably by a computer, for clarity of the present exposition, those skilled in the art will recognize that activation system components may be stored and executed in different computers/machines.

The Service Provisioning System(s) (SPSs) 402 generally includes a generic set of rules that build/assemble/compose service orders to be provisioned on the managed network. The SPSs 402 is communicatively linked to the order processing system 406 through messaging interfaces 407. Likewise, the order processing system is connected to DMs 410, 415, and 420 through peer manager(s) 380. The EMSs are in physical interconnection to the managed network elements $430A_1$–$430A_n$, $430Z_1$–$430Z_m$, $432A_1$–$432A_n$, $432Z_1$–$432Z_m$, and $434A_1$–$434A_n$, $434Z_1$–$434Z_m$. The desired/requested service orders are sent to the order processing system where they are split into individual service components with optional dependencies between the components. This device/location dependent data is sent to the appropriate EMS's for device specifics commands to be composed and communicated to the device. Order processing system 406 also deals with date tracking and pending of orders to activate at some time in the future. When a component is ready to be activated it is sent to an domain manager. Order processing system 406 generic rule sets can submit component activation request, request closure, request the component activation be rolled back or reversed, and request component activation status. A single domain manager can possibly manage all elements management systems or network management systems in a network, or multiple instances of a domain manager can be created to divide up the elements management systems by type of managed network element. This flexibility facilitates network management system's work-load distribution and scalability. The DMs can include a queuing mechanism that allows multiple, independent components to be sent from order processing system 406 to the DMs 410, 415, and 420.

To provide a flexible (ability to add a wide range of services and to do so in a manner to incorporate customer business rules) and extensible service provisioning application, the USAS 400 employs network management system 200 as the core real-time expert engine and development platform. The rule-based service provisioning application based on the network management system 200 defines an advanced operating environment with embedded service provisioning capability for the Universal Service Activation System 400. In other words, real-time service activation utilizing any type of intelligent network device can be achievable through a controlled and integrated approach with existing OSS processes via customized process rules to satisfy the unique business needs of a Service Provider's network operation. The advanced operations environment of USAS 400 allow rapid implementation of operations solutions that are preferably open, scalable, and can be tailored to meet unique operations needs. The environment is consistent with industry standard Telecommunications Management Network (TMN) recommendations.

The Universal Service Activation Architecture can provide "Independent Domain Management", i.e., integrated management over all network elements that make up a single sub-network or DMs 410, 415, and 420 at the Element Management Layer (EML). A single DM may manage device EMS's and systems within common geographic, functional or organizational boundaries, such as a city, operations center, or even partner company sub-network. Further, this architecture provides "Interdependent Network Management" at Network Management Layer (NML) OSSs to handle end-to-end operations across all domains in the network. By performing supplier and sub-network specific operations within each domain, the Universal Service Activation system 400 is then more resilient to supplier, technology, and architecture variances in any given domain. Thus, while domains can each be managed independently, end-to-end network operations may be coordinated interdependently. Additionally, the present invention provides the capability for end-to-end service management. This layer of operations provides the capability for end-to-end management of services independently of the underlying network infrastructure. This allows services to be added or changed with minimal impact on the management of the network itself and correspondingly shields the management of services from changes within the network.

Common access to operations data can be provided through messaging interface(s) 407, data archiver(s) 354 and SAS 375. Order processing system 406 having a complex set of rules is preferably employed to manage the life-cycle of service orders and to provide instantaneous order status feedback to the users.

With continuing reference to FIG. 8, the SAS 375 generally performs the service management functions, and distribution of service orders to the exemplary Domain Managers 410, 415, and 420 that are managing their respective destination Network Elements (NEs) $430A_1$–$430A_n$, $430Z_1$–$430Z_m$, $432A_1$–$432A_n$, $432Z_1$–$432Z_m$, and $434A_1$–$434A_n$, $434Z_1$–$434Z_m$. SAS 375 makes extensive u of order processing system 406 for the order management process, the palette of objects, intrinsic and rule-sets that support the service provisioning process for access providers and local exchange carriers. The service components flow from order processing system 406 to a collection of DMs 410, 415, 420 through peer manager(s) 380 where such customized interfaces provide the mediation process. Order processing system 406 palettes provide the basis for the following functions. The "External Status Notification" function of order processing system 406 inform external systems of order status, as the order progresses through its life-cycle. With the "Error Propagation function", all errors and reasons e propagated to the external system (in this case the Service Provisioning System(s) 402), if failures occur. The "Persistence" function ensures that the service order supporting data remain in the system as long as required to support rollback and recovery. The "Critical Date Management" function is provided so that the service orders that are in the active state (IN-PROGRESS) are managed within a work queue. A NMS 200 may poll (configureable) perform periodic evaluation of service orders and their components to ensure that service levels are met. Service Orders that have not yet completed and have exceeded the critical date specified will alarm. These alarms are displayed in the alert display/user interface 245.

The "Pending" function of order processing system 406 is provided, so that the service orders can be pended indefinitely for processing. Pending supports batched and immediate requests. Through acknowledgments and redundant polling the integrity of data within the system is assured.

Intra-service order dependencies, i.e., component (Work Unit) dependencies impact the service order provisioning process. Components can run in parallel as well as adhering to predecessor and successor rules. The "Inter-service order dependencies" provide for time-stamping for auditing purposes. This data can be used to determine inefficiencies in the service activation process and eliminating the bottlenecks. Also, where external interfaces persist, the performance operating efficiencies of partners and competitors can be monitored and reported on. Using the "Validation" function the preferred implementation of the USAS 400 validates scheduled dates (a request for an earlier date is rejected) order types and formats. Similarly, using validation function service order duplication may be checked and alerts could be generated if this integrity is violated. Moreover, using "Order Management" function, service order components can be acted upon using the dependencies described above and real-time view of orders in progress, completed, and errant orders can be generated.

The Universal Service Activation System 400 provides substantially seamless integration of activation system 405 with peer manager(s) 380, where the DMs 410, 415, and 420 are preferably notified through events of resource requests.

The number of domain managers, network managers, element managers and external interfaces supported is limited solely by the speed and capacity of the hardware selected. To facilitate growth, it is preferred that SAS 375 run on a dedicated server machine that can support additional memory, secondary storage and CPUs. SAS 375 is the preferred point of interface for all activation requests initiated by the service order entry through SPSs 402. Once the design of a service order is completed, a request is issued to the SAS 375 where the service order could be managed until completion. SAS 375 coupled with the DMs 410, 415, and 420 provide a complete end-to-end service order process capability from scheduling to completion. All service order status changes and error messages are generally updated in the SPSs 402.

Operator Workstations/User Interfaces 245 are preferably used to perform health and status monitoring and to provide a maintenance interface in the event of system failure for the overall USAS 400. This includes the health of the SAS 375, DMs 410, 415, and 420, active and recently completed orders, scheduled date jeopardy etc. From these workstations 245 operational support staff may receive real-time status information of the system, connectivity and service order status. Trouble tickets can be issued either manually or otherwise automatically based on the requirements of the system performance.

SAS 375 may be replicated to meet disaster contingency requirements. The servers of the DMs 410 415, and 420, are preferably tightly coupled with activation system 405 to provide end-to-end service provisioning functionality. The domain manager is generally responsible for taking a provisioning work unit and decomposing the service component in atomic activation requests which can be delivered to the Element Management System (EMS).

The Universal Service Activation process is preferably enabled by the NMS's 200 Peer-to-Peer framework extension which allows for geographical or functional distribution of expert system functionality. Using Peer-to-Peer framework, activation system 405 can be close-coupled with multiple domain managers for accomplishing service management needs.

DMs 410, 415, and 420, can validate the incoming data from the component queue of incoming transactions to throttle request to the desired NE. This can generally guarantee the sequential handling of each request, although utilize prioritized queuing, in which critical tasks are processed first. Further, DMs 410, 415, and 420 may issue a configureable number of retries prior to failure using the data from order processing system 406 and produce NE specific translations as transaction elements. Also, DMs 410, 415, and 420 can provide the "Access Facility" to the Network Elements to manage the issuing of the events to the NE. The access facility is the mechanism used to provision an element. For example, a DMS switch can be provisioned using different appropriate commands (or both in some instances dependent on model). The access facility can be re-used independent of the service being provisioned on the element.

DMs 410, 415, and 420 could enforce defined rollback policies, such as, "Complete Rollback" by rolling back the transaction if it fails. Similarly, they can enforce "Partial Rollback" by noting element failure and continuing. This type of partial rollback policy is primarily used in large transactions such as trunk member definition where partial success is acceptable.

Figure 9:
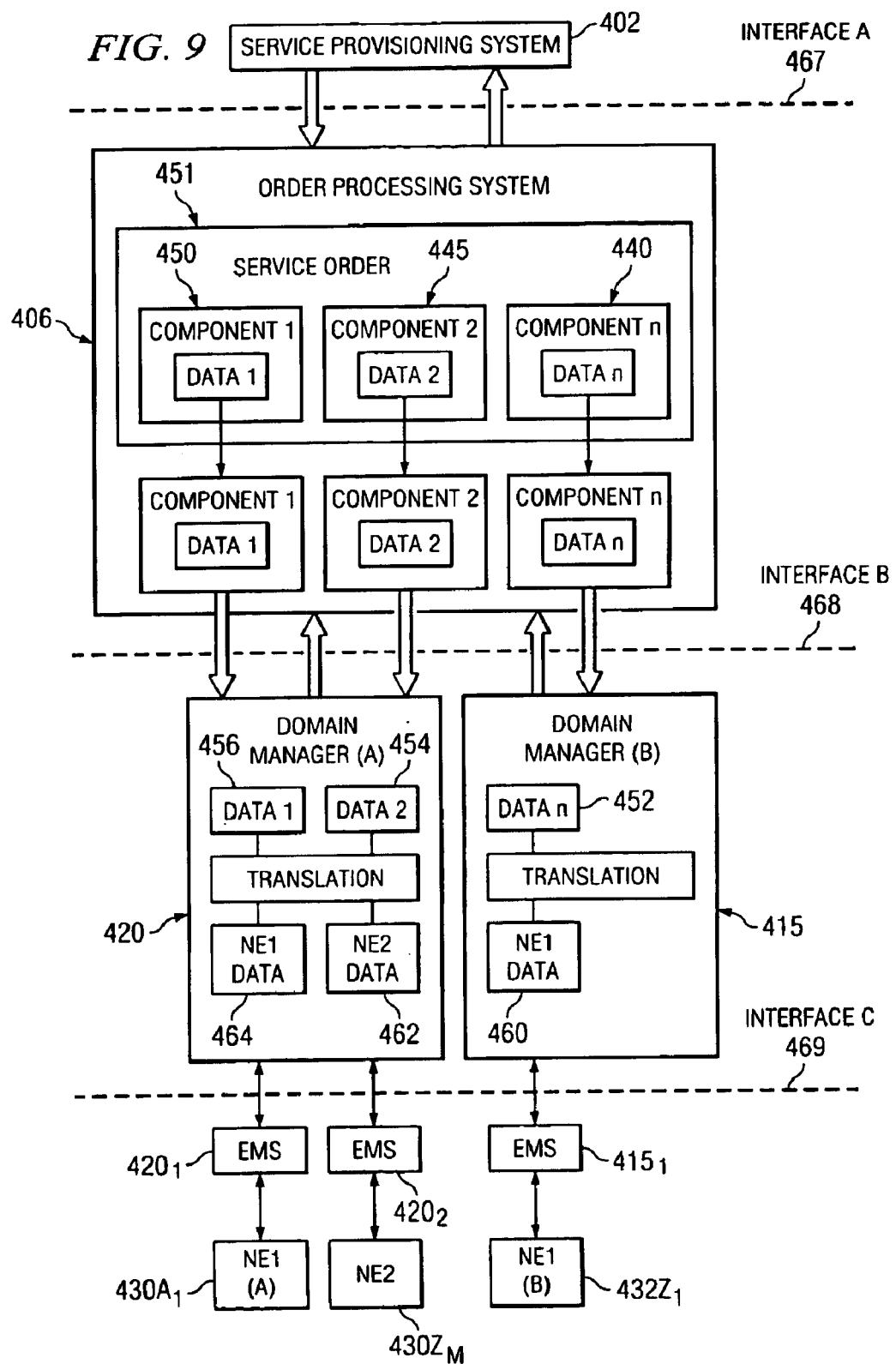
FIG. 9 is a block diagram describing the data flow in a one embodiment of the Universal Service Activation System (USAS) employing the Universal Service Activation Architecture shown in FIG. 8.

Referring to FIG. 9, the block diagram describes the data flow in a one embodiment of the Universal Service Activation System (USAS) 400 which employs the Architecture shown in FIG. 7. The universal (generic) service component instances 440, 445, and 450 entered in the service provisioning system 402 are grouped together to form a service order 451. This is a sample service order request employing one embodiment of the present invention to illustrate how to construct activation system 405 service order and order administration requests. For example, universal (generic) service component instances 440, 445, and 450 contain component data 452, 454, and 456 respectively. The components can be inter-related and there relationships can used to describe the order of service activation, and to build more complex services by grouping multiple service components. A specific service component not only describes specific service but also has a logical ordering with respect to other service components. This ordering applies both to the activation flow and (if required) the backing out (or rollback) of the service component.

Numerous benefits of a common component approach versus vendor or version specific component at the upstream interface (farthest from SAS 375, for example, here in SPSs 402) can be derived in the whole activation process.

For example, SPSs 402 (the source of activation information) are not forced to maintain vendor specific commands, configuration parameter names, valid values, etc. Similarly, some devices implement different valid values for a single parameter based on the device-level management protocol used (e.g. TLI versus PDS). Service provisioning systems should be insulated from this detail, user knowledge required, and the storage implied.

Reduced complexity in formatting service orders is achieved by employing universal service component. The service component format is identical for all network functions independent of the vendor/mode/software version. This is in contrast to supporting multiple variation, e.g., 15 or more components per model/version. For example, with 10 NE/domain types, this could be over 150 different component formats (excluding version differences) that have to be maintained in Service Provisioning.

Adding new vendor models at the element level requires little or no changes to the Service Provisioning. Software version updates to devices which result in changes to their configuration messages and formats do not require changes in Service Provisioning. These changes are localized to the domain/element managers where the new formats must be supported anyway. The circuit/facility designer (and/or design & assign application) is also not burdened with these device specific, or management protocol specific details. A probable benefit here is that the need for vendor specific training and skill-sets is reduced. There is also a potential reduction in the number of designers required due to increased efficiencies resulting from a more general component format.

New components can easily be created for custom services and the supporting service object network(s) can be added to the activation system to support these new components during runtime with no downtime. The ease of extensibility will improve time to market for new or varied services. Business rules can easily be applied and/or modified for the activation process (e.g. activating a service with alarms enabled or disabled) down to network element instance granularity.

With continuing reference to FIG. 9, because of the vendor neutral nature of the service components 440, 445, and 450, generally they must be translated into vendor specific terminology before they can be activated on a network element. This can involve various stages of translation including parameter mapping (parameter names and parameter values), service decomposition, default support, mandatory/optional support, validation support, and command composition. Generally, the component data 452, 454, and 456 contain the higher level commands that are to be interpreted and translated by a domain manager. In our representative example, DMs 415 would be employed for this purpose. The translated commands are sent to a destination network element in a device specific syntax, for example in this illustrative example it could be any one of the network elements $430A_1$ or $430Z_M$ or $432Z_1$ through corresponding EMSs $420_1$ or $420_2$ or $415_1$ respectively. The component status is the result of the interpretation, translation and execution processes.

Since the universal service component preferably describes all service parameters in vendor neutral terminology, these parameters generally need to be mapped to vendor specific terminology before the network element or element management system can interpret them. Usually, there are two parts to every parameter, a parameter name, and a parameter value. In a universal service component both parts can be vendor neutral and therefore both parts may require mapping.

A service component can represent a single command in one vendor's domain and multiple services in another vendor's domain. This one to many mapping is referred to as service decomposition (atomic, multi-step and/or logical) and is a necessary step in moving from a universal service component into a vendor specific service activation(s). This is also where business rules can be applied.

As shown in FIG. 9, a simple service order scenario is included which illustrates the general concept of grouping universal service components into service orders and decomposing service components into specific services or commands supported by the network in one of the embodiments of the present invention. Service components 440, 445, and 450, having component data 452, 454, and 456 respectively of a desired/requested service order 451 may be interpreted, translated, and executed depending upon the nature of the associated data. For example, after decomposition, component data 452, 454, and 456 is sent to appropriate DMs 415 and/or 420. In this particular case, both DMs 415 and 420 receive data. However, after appropriate interpretation, activation system sends component data 454 and 456 to DMs 420 and DMs 415 receives component data 452. In DMs 415 and 420, the received component data is translated in vendor/device specific terminology and sent to targeted network elements $430A_1$ or $430Z_M$ or $432Z_1$ through corresponding EMSs $420_1$ or $420_2$ or $415_1$ respectively.

Most service activation is accomplished by delivering commands or data in a format defined by the vendor specific system providing the enabling the service. Part of the service translation process involves composing these commands based on templates specific to the vendor. These commands are composed to support the specific device functionality through the devices own commands sets. Devices support a collection of commands including both single entity, and range (or bulk) affecting commands.

The interface A 467 between activation system 405 and service provisioning system(s) 402 can be a generic gateway 235 or via RDBMS table access. It should be apparent to the those having skill in the variety of interfaces can be devised to communicate between various order creation systems and activation system 405. For example, if the SPSs 402 is based on an underlying database, a DB protocol agent gateway may be employed. To interface to other type order creation system, a specific type of protocol agent may be needed. In these cases, some custom code may have to be written to forward the order into the activation system gateway and to forward status updates from the activations system gateway back to the order creation system. Further, if the upstream system (customer care or service order entry or service provisioning system) is providing a custom order format to activation system 405 and a NetExpert or NX gateway is used for the interface, then the service order parsing rules must be created. If the upstream system can support the format indicated for activations system 405, then no customization is required.

When the gateway is started, the start dialog issues a message to inform the upstream system/SPSs 402 that activation system 405 is ready to receive service orders. When it is stopped, the stop dialog generally sends an "activation system 405" not available message to the upstream system/SPSs 402.

The interface B 468 defines the bi-directional communication that occurs between an instance of order processing system and domain managers (DMs). In one embodiment of the present invention, a activation system registry is used to define the service order/request routing and the parameters of the routing. In order for activation system 405 to be aware of the availability of an domain manager (DM) that can serve a specific network elements identified by a network ID, the DM preferably informs activation system 405 the network ID's that it supports. The information is generally kept in activation system registry for later usage in component distributions. Interface C 469 is normally a bidirectional and employed to communicate between network elements (NEs) via element management system(s)(EMSs) and domain manager(s)(DMs).

Figure 10:
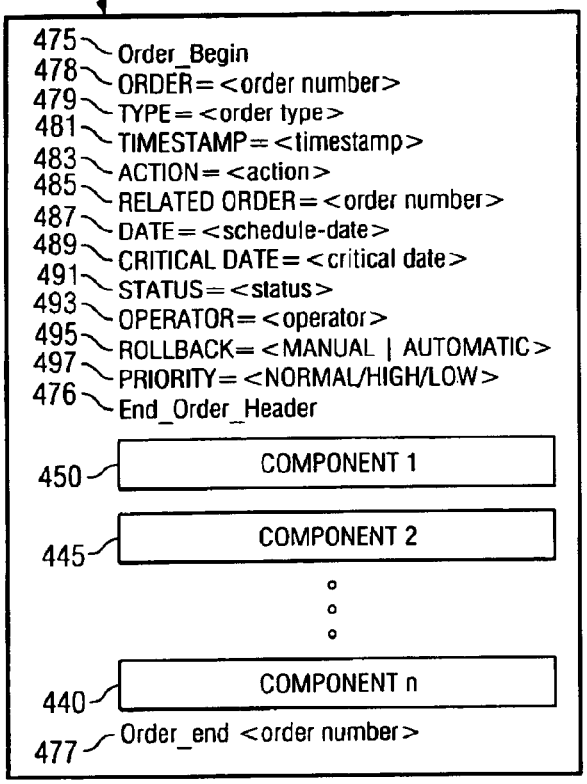
FIG. 10 shows an exemplar service order definition composed of universal(generic) service components employed in a one embodiment of the present invention.

FIG. 10 indicates a preferred universal service order definition 451 composed of universal (generic) service components 440, 445, and 450. Service order 451 comprises order- and component-level information. FIG. 10 shows order-level information. The exemplary service order 451 format further comprises of Order begin header 475 to indicate the beginning of a service order, Order end header 476 and Order end statement/command to indicate end of the service order with order number as an attribute. Further the Order header preferably includes a set of predetermined parameters having a parameter name and a corresponding particular value. For example, in FIG. 10 illustration, following parameters are included: ORDER 478; TYPE 479; TIMESTAMP 481; ACTION 483; RELATED ORDER 485; DATE 487; CRITICAL DATE 489; STATUS 491; OPERATOR 493; ROLLBACK 495 could be assigned manual or automatic; and PRIORITY 497 could be assigned normal, high, expedite or low.

Figure 11:
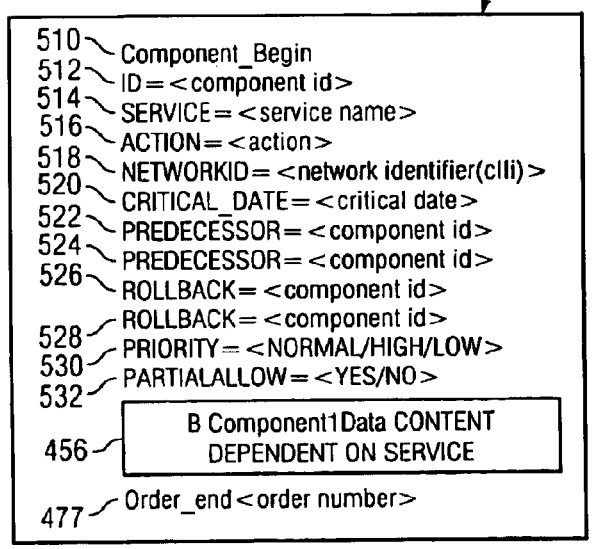
FIG. 11 shows an exemplar universal(generic) service component definition composed of vendor neutral parameters, attributes and their values employed in a one embodiment of the present invention.

FIG. 11 shows component-level information for a preferred individual universal (generic) service component 450 definition having component data 456 generally being dependant on service. The exemplary universal (generic) service component 450 format further comprises of Component begin header 510 to indicate the beginning of a component and Order end statement/command to indicate end of the component with order number as an attribute. Further the Order header preferably includes a set of pre-determined parameters having a parameter name and a corresponding particular value. Similar to FIG. 10 format, in FIG. 10 illustration, following component related parameters are included: ID 512; SERVICE 514; ACTION 516, NETWORKID 518; CRITICAL DATE 520; PREDECESSOR 522; PREDECESSOR 524; ROLLBACK 526; ROLLBACK 528; PRIORITY 530 could be assigned normal, high or low; and PARTIALALLOW 532 could be assigned yes or no.

In a preferred embodiment of the present invention, Universal Service Activation System 400 associate EMS's employ a standards-based Common Object Class Library (COCL), a set of object definitions that can be reused across a broad variety of OSSs, simplifying integration and reducing application development time. This object-oriented paradigm allows to more accurately capture/reflect/model the real world physical managed network. Further, the object-oriented environment is preferably employed to find the relevant object, and then activate the object. Accordingly, MIBs are built as containment hierarchies with relationship pointers to other objects (COCL is manifested in the NetExpert MIB via a RDBMS). However, MIBs could just as well be designed using a relational database table structure. The MIB structure (these objects and associate structure are not included in the COCL) in the present invention can allow the logic to traverse the hierarchy generally employing containment or pointers to find/add a required object. The service activation object search mechanism used in one of the preferred embodiments of the present invention use properties and relationships between the objects, which define the behavior of the mapping of the generic service and actions (generic parameter/values included). Essentially, the object is "empowered" to operate by calling methods (functions), using attribute variable(s) contained within the activation message, within itself, or within related objects.

In Universal Service Activation System 400 the associated EMS's use the COCL to model network elements NEs and their associated modules. Ultimately, the COCL is the 'glue' that enables applications (NMS/EMS's from the NE and network point of view) to work together, helping providers reduce the cost and complexity of integrated management. Additionally, universal service activation architecture makes service provisioning easier by providing graphical editors for describing orders of service activation that integrate into a NMS without disrupting operations. System administrators or authorized network operators can use these editors to build more complex services by grouping multiple service components more easily. The editors also facilitate faster processing by making the system extendable with reusable rules or programs that can reside on the main server and/or distributed gateways.

Service providers can easily add domain manager and element manager(s) to the system as the number of network elements types and numbers increase—expanding system performance without incurring huge costs.

With reference to FIG. 9, DMs 410, 415, and 420 may receive generic component activation requests from order processing system 406 and map the activation request into specific element transactions through the use of Service Activation Objects (SAOs) generally stored in EMS/NMS/OSS MIB 250. For more standardized protocols such as SNMP, CMIP, and CORBA, the inference base 250 could keep track of Abstract Syntax Notation (ASN. 1) MIBs, Guideline Definitions for Managed Objects (GDMOs), and Interface Definition Languages (IDLs).

Service Activation Objects are a special type of managed objects used to define different behavior between various devices for a common service action combination. These objects are a persistent storage for mapping sets, default parameters, mandatory/optional as well as more complex constructs such as rollback behavior, multi-step activation, and decision flows. The DMs 410, 415, and 420 are preferably designed so that adding new device type and/or new supported service combinations could be accomplished entirely by adding/building new managed objects. The managed objects can be defined in a text file format e.g. ASCII and added/stored to EMS/NMS/OSS generally through messaging interface(s) 407 into the EMS/NMS/OSS MM 250. Service activation objects and object networks (ONs) can also be constructed by the service builder 257 that connects service activation objects to vendor/device specific solutions for service activation. This allows modification of activation functionality on the fly without having to modify rule sets or reinitialization the network management system.

In the present invention, service activation and service modeling is typically performed by employing Object Networks. Object networks are a collection of objects where the objects' properties, and the relationships between the objects, define the behavior of the network. This concept is directly related to the field of artificial intelligence known as neural networks. By building an object network to represent a service component, this invention can model both a universal service and its translation into a vendor specific service(s) in one place. An object network can persist the service translations (parameter mapping, service decomposition, and command composition), service defaults, and service enablers such as; inventory locations, activation interfaces to element management systems, and current activation state.

At least three distinct decomposition patterns can exist that result in three different types of objects; logical, multi-step, and atomic. The term atomic is chosen because this object generally will not be broken down any further before resulting in a vendor specific activation request. Both the logical and multi-step object structures will preferably eventually be broken down into one or more atomic objects.

A multi-step object can be used when a service decomposition requires more than one vendor specific activation to be requested in a pre-determined sequence. When a multi-step object is identified it is broken down into its sub-objects (steps) and each step is worked on in turn.

A logical object may be used when a service decomposition requires a decision to be made to determine what should be done next. An example of such a decision is to test for the existence of some network resource and continuing on different activation paths based on the results of the test. The framework will call a logic event/function defined in the object to make the decision and the logic event/function will return the name of one or more objects that represents the result(s) of the decision.

By combining objects of different types into object networks a detailed decomposition pattern can be constructed to direct the universal to specific service mapping. Each service (object network) can be labeled to create a family of service variations. This label can include service name, service version, vendor name, vendor version, device name, location, and many other discriminators. Depending on which discriminators are present a service variation can be identified.

Figure 12:
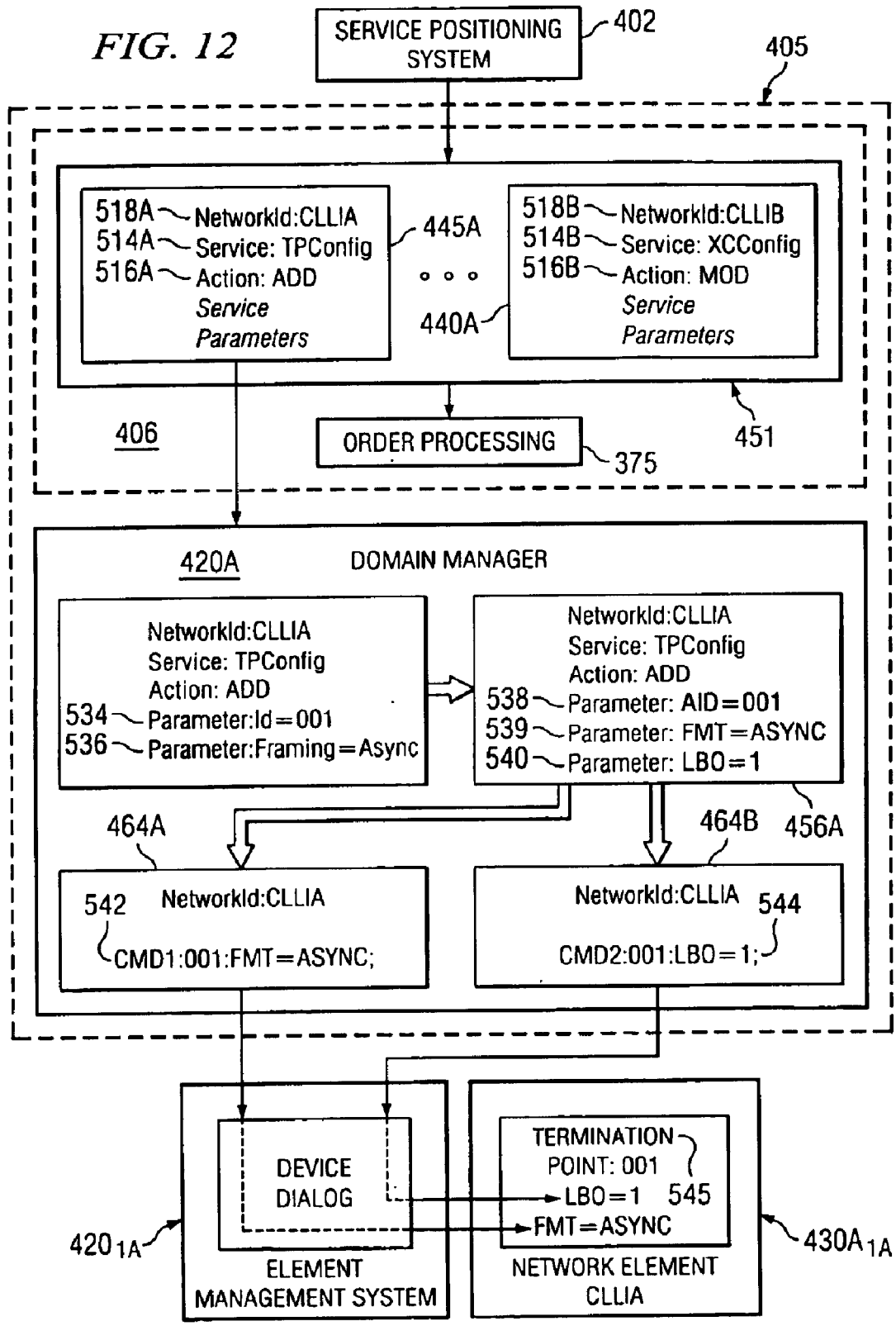
FIG. 12 shows an exemplary universal service activation method including, universal service translation (including parameter mapping, service decomposition, and command composition) for an exemplary service order composed of universal service components and their relationships employed in one embodiment of the Universal Service Activation System (USAS) of the present invention.

FIG. 12 presents method steps of how a service provisioning system can create a service order composed of universal service components to request the activation of a termination point on a network element. The service provisioning system 402 is employed to create the service order 451 composed of universal service components 440A and 445A. The universal service components 440A and 445A have a pre-determined set of service parameters and their values including "NetworkID: CLLIB" 518B, "Service: XCConfig" 514B, "Action: MOD" 516B and "NetworkID: CLLIA" 518A, "Service: TPConfig" 514A, "Action: ADD" 516A respectively.

The domain manager 420A references its object network for "Service: TPConfig" 514A and "Action: ADD" 516A for specific network element: CLLIA 430A$_{1A}$ using "NetworkID: CLLIA" 518A or a family (e.g. different device type and/or version) of devices to which CLLIA belongs. This object network stores the parameter mappings and default to be applied. For example, using parameters including "Parameter: Id=001" 534 and "Parameter: Framing= Async" 536 parameter mapping and default substitution (e.g. LBO) is done for "Parameter: AID=001" 538 and "Parameter: FMT=ASYNC" 539 and "Parameter: LBO=1" 540. The network is also a multi-step which decomposes the single service component into two service activation requests. In this example, service component 456A results in multiple activation requests 464A and 464B during the service decomposition step. The command templates stored in the object network are used to compose device specific commands. For example, command composition is done using "<CMD>:<Id>:<parameter>;" to "CMDI:001:FMT= ASYNC;" 542 and "CMD2:001:LBO=1;" 544. Finally the domain manager 420A passes the data (commands) 542 and 544 to the EMS 420$_{1A}$ for it to forward (dialog) to the network element CLLIA 430A$_{1A}$ and activate the requested service on the network. This simple example illustrates the method steps for employing the service provisioning system 402 to create the exemplary service order 451 composed of universal service components 440A and 445A to request the activation of a termination point 545 on a network element CLLIA 430A$_{1A}$.

Figure 13:
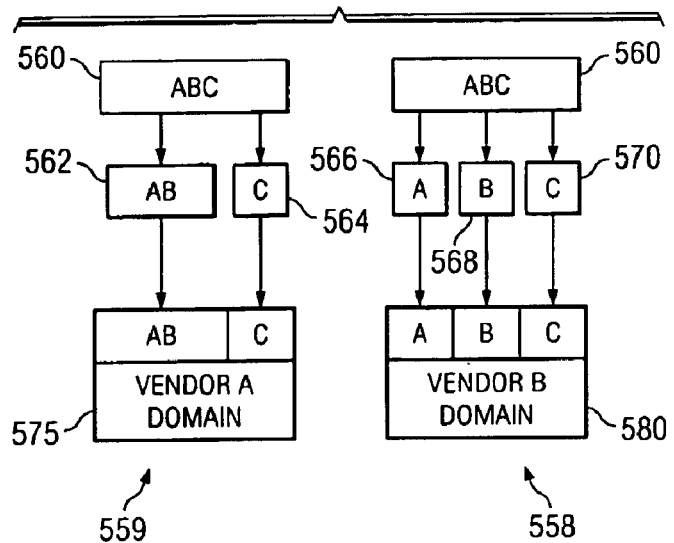
FIG. 13 show exemplary Object Network(ON) views of simple service decomposition scenarios of service "ABC" in one embodiment of the Universal Service Activation System (USAS) of the present invention.

FIG. 13 illustrates a simple service decomposition scenarios of service "ABC" 560. For example in scenario 559, service "ABC" 560 is decomposed into activation requests (commands) "AB" 562 and "C" 564 for vendor domain A 575. Alternately, service "ABC" 560 may be decomposed into activation requests (commands) "A" 566, "B" 568 and "C" 570 for vendor domain B 580.

This simple example illustrates the general concept of decomposing a universal service into specific services or commands supported by the network. The sections that follow illustrate some of the many possibilities that exist for modeling detailed decomposition scenarios.

For example, service order 'ABC' 560 can be described by object network 'ABC_VendorA' as well as object network 'ABC_VendorB'. Both networks represent the same service, but the translations represented by the two networks are very different. By adding another discriminator, like device name, object network 'ABC_VendorA_ CLLICodeA' can be created to represent the universal service 'ABC' on Vendor A's devices for a specific device in the network, CLLICodeA. The method of finding a suitable object network for service activation can allow for network views. If a service label with a specific device name is found then a device specific activation will occur, if not then a vendor specific activation, suitable for all of that vendor's devices, will occur. The other advantage of network labels is that services can evolve both on their own, or in step with evolutions in a vendor's technology (i.e. versions), and the evolutions can coexist.

The service models are interpreted by a service translation/activation application (domain manager). This application's behavior changes dynamically based on the object networks that are fed into it. By adding or removing objects the system can support or not support specific services. The base application is only the interpreter. The high level of adaptability is a result of the objects that describe and determine the applications behavior.

By combining object networks and developing new object relationships the application can support more complex functionality. Two examples of this added functionality are recovery and rollback. Recovery is the process of trying another service or combination of services, after an initial activation attempt has failed. Rollback is the process of undoing a previously successful activation to return to the prior state. Both of these scenarios result in links between and within object networks. The Domain Manager 420A has knowledge of network elements (device type, device version, device ports) and has access to multiple elements within the network. However, the Domain Manager 420A also has the ability to model complex services (using Object Networks) and can convert these services into element level service activations. In a preferred embodiment of the present invention, universal service components provide a language for an order entry system (or Service Provisioning System) to request the activation of a service(s) on a network element. The Object Network(s) provide a map for the activation system (mainly the Domain Managers) to translate these service requests into element level activation(s). Furthermore, the Object Network(s), which represent the map with which to perform service translation, are stored in a database so they can be loaded and saved persistently and survive system shutdown. The Universal Service Activation provides vendor independence within technology domains and in a variety of network technology domains. For example, a grouping of services for Digital Cross Connect, SONET, and SDH devices regardless of how a specific device vendor implements these technologies may be activated. There are other technology domains including, Wireline, wireless, IP/Data, etc. where Universal Service Activation System may be deployed. In other words, the USA Architecture of the present invention generally provides a service activation methodology that is independent of technology.

Figure 14:
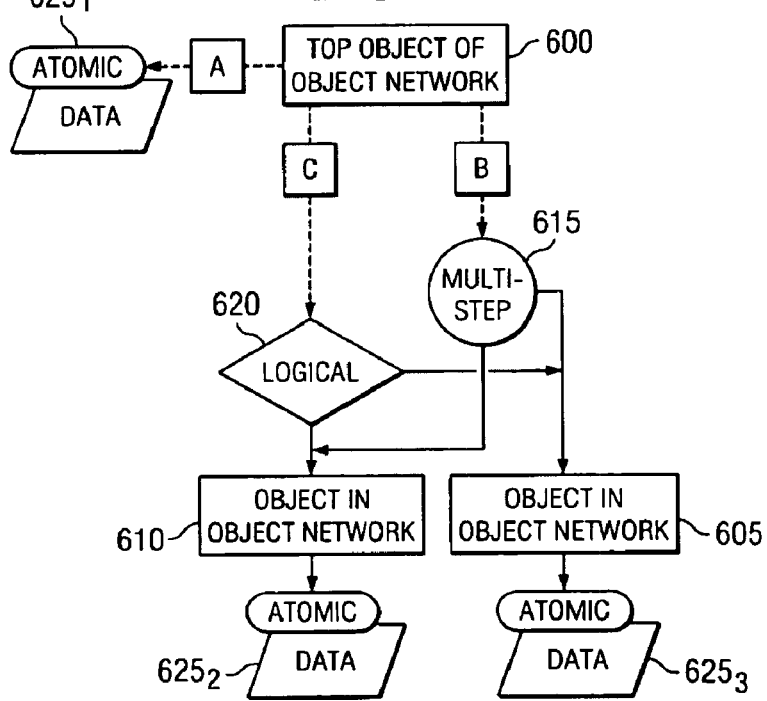
FIG. 14 shows service modeling using Object Networks (ONs) (including multi-step, logical, and atomic objects) in one embodiment of the present invention.

FIG. 14 provides an exemplary Object Network. Atomic service activation objects (SAOs) are the basic element and represent one specific activation request. Multi-Step service activation objects (SAOs) are generally used when service decomposition requires more than one specific activation to be requested in a pre-determined sequence. When a multi-step object is identified it is broken down into its sub-objects (steps) and each step is worked on in turn. Logical service activation objects (SAOs) are typically used when service decomposition requires a decision to be made to determine what should be done next. The structure for objects shown in FIG. 14 can be presented visually by the service builder 257 as editor in FIG. 5. Utilizing solutions built by connecting service activation objects, network performance can be modified at run time without requiring the system to be recompiled, reset, or reinitialized. In other words, the universal service activation system and method is configurable i.e., which builds/connects vendor/device specific service activation object networks that can have behavior modified at run time without resetting the system while improving time to market for new or varied services. The preferred steps for the Universal Service Activation Process including, Universal Service Component Translation process, parameter mapping, service decomposition, default support, validation support, and command composition are enumerated in a logical fashion. In the first step determine the appropriate top object 600 of the object network based on service name, service version, vendor name, vendor version, device name, location, and many other discriminators. At every step (level) of the Object Network objects 600, 605, and 610 the following steps may be performed in the preferred order:

1ON. Determine appropriate top object of object network based on service name, service version, vendor name, vendor version, device name, location, and many other discriminators.

2ON. Supply parameters.

3ON. Add default parameters for data not supplied.

4ON. Map parameter names from generic to specific (e.g Framing=Async maps to FMT=Async)

5ON. Map parameter values from generic to specific (e.g. FMT=Async maps to FMT=ASYNC)

6ON. Call optional mapping function to perform advanced mapping or to add more parameters (dynamically versus default).

7ON. Call optional validation function to perform advanced validation (e.g. against inventory system).

If a step in the object network is ATOMIC it can be seen as a terminator. In other words, the data (mapped parameters) at this point is ready to be sent to an EMS for activation. Additionally command composition can occur based on a command template stored in the object. Command composition allows more vendor specific details to be encoded in the object network resulting in a simpler EMS.

In building an Object Network any object in the network can be either MULTI-STEP 615, LOGICAL 620 or ATOMIC $625_1$, $625_2$, and $625_3$. Atomic objects are the last step before sending data to the EMS. Multi-step objects describe a fixed number of ordered steps (objects). Logical objects result in a call to a custom function that can dynamically determine the next step(s)/object(s) in the network.

Service Activation Objects are a special type of managed object (MO) used to define different "behavior" between various devices for a common SERVICE/ACTION combination. These objects are a persistent storage for mapping sets, default parameters, as well as more complex constructs such as rollback behavior, multi-step activations, and decision flows. The DM are preferably designed so that adding a new device type and/or new supported SERVICE/ACTION combinations could be accomplished entirely by adding new Service Activation Object MOs. Each device type (e.g. NEC2400, Titan5500, etc.) has its own set of Service Activation Objects, one or more per SERVICE/ACTION supported, that defines the behavior of that device type. These Service Activation Objects can be defined in a text file format and added to the DM at run time. This core set of Service Activation Objects can be enhanced down to a per-device level (TID) so that each individual device in the network could have different defaults for the same SERVICE/ACTION combination.

An Atomic Service Activation Object is a Service Activation Object that directly results in the initiation of an EMS service activation event. Atomic Service Activation Objects have the 'Behavior Event' tag (DMsBehaveEvent attribute) filled in. The term atomic was chosen because this Service Activation Object is not broken down any further before resulting in an EMS event. Both the Logic and Multi-Step Service Activation Object structures are eventually broken down into an Atomic Service Activation Object.

A Multi-Step Service Activation Object is used when a SERVICE/ACTION requires more than one service activation EMS event to be called in a sequence. The top level (e.g. generic SERVICE and ACTION) Service Activation Object exists only to define the sequence of Sub Service Activation Objects (all atomic for example). When the Domain Manager identifies a Multi-Step Service Activation Object it then breaks this object down into its Sub Service Activation Objects for processing.

A Logical Service Activation Object is used when a SERVICE/ACTION requires a decision to be made to determine what should be done. An example of such a decision is the 'smart' MOD decision diagram. In other words, MOD becomes ADD if termination point object doesn't exist. The Domain Manager DM calls the Logic Event to make the decision and the Logic Event returns the name of a Service Activation Object that represents the result of the decision. The contents of each Service Activation Object within the Domain Manager rule-set can generally be viewed using any text editor.

In one embodiment of the present invention, a high level overview of Domain Manager DM service activation, EMS Service Activation Object events and how they are used within a Transport Domain Manager Application is provided for illustration purposes only. As those skilled in the art will appreciate, the high level overview described here is an example only and not to be construed as design limitation required for employment in the preferred embodiment of the present invention.

Service Activation Object Events are events that exist within the Domain Manager DM or service activation EMS rule-sets. These events are used by the Domain Manager DM to perform several types of functions. These functions range from generating direct service activation events, mapping specific or unique device values, retrieving required values from the MIB, and performing logical operations. The following paragraphs briefly discuss the four types of Service Activation Object Events.

Each Atomic Service Activation Object in the DM preferably includes a Behavior Event to call in order to activate a service. In most cases, this Behavior Event is an event in the service activation EMS rule-set. The Behavior Event is called after a transaction (order processing system 406 component in the activation system 405) is fully mapped from generic to specific terminology, defaults are applied, and the transaction is ready to be activated. Prior to calling the Behavior Event the DM determines, based on a flag in the Service Activation Object, how the service activation EMS rule-set wants to receive the parameters.

A Value Mapping Event (VME) is used by the Domain Manager DM to do additional mapping that it cannot represent in the Service Activation Object itself. The Value Mapping event is passed two parallel sets, one with specific parameter names, the other with specific parameter values (except for the values that are to be mapped). The VME is responsible for pulling out the unmapped values, mapping them, and inserting them back into the set. The VME can also add new parameters and values to the sets if the EMS requires more information not available up to this point.

An Existing Service Event is used by the Domain Manager to retrieve the DMsDeviceParams and DMsDeviceParamValues sets from the correct inventory MO. Because of the differences in MO naming among the EMS rule-sets this event approach is useful to allow a variety of naming conventions including relational database access.

A Logic Event is used by the Domain Manager to make a decision about which Service Activation Object to use for a given SERVICE/ACTION. The event can use the parameters and values passed to it with the MIB parameters to make its decision. This event preferably should not query the device because it would be bypassing the queue and port management mechanism and could also affect system performance. The important aspect about a Logic Event is how it names the resultant Service Activation Objects. In order for the Logic Event to work in a system the specific resultant Service Activation Objects generally must exist. As a result the designer of a Logic Event is the one that dictates the names of the resultant Service Activation Objects, and this naming convention becomes part of that specific Logic Event's interface.

Further, an overview of creating Atomic, Multi-Step, and Logical Service Activation Objects is illustrated, including Service Activation Object Types, Atomic Service Activation Objects, Multi-Step (Sub) Service Activation Objects and Logical Service Activation Objects. The type of a Service Activation Object is preferably determined by which of the Logic Event, Sub Service Activation Object, or Behavior Event tags is filled in on the Service Activation Object template.

An Atomic Service Activation Object is a Service Activation Object that has the 'Behavior Event' tag (DMsBehaveEvent attribute) filled in. The term atomic is chosen because this Service Activation Object is not broken down any further before resulting in an EMS event. Both the Logic and Multi-step Service Activation Object structures are eventually broken down into an Atomic Service Activation Object.

Next the method steps contemplated for an illustrative example are articulated to create an Atomic Service Activation Object employing the Service Activation Object template in one embodiment of the present invention:

1SAO. Begin by filling out the template header. The information in the header is used to name the Service Activation Object (e.g. DM_NEC2400_R102_SONETXC_ADD). If a network ID is provided a specialized Service Activation Object is created for a specific element in the network (e.g. DM_NEC2400_R102_CLLIA_SONETXC_ADD).

2SAO. The next part of the template is probably the most important since it describes all of the parameters that this Service Activation Object can use. The basic procedure for filling out this section is to write down all the parameters that EMS (behavior event) can use to perform this SERVICE and ACTION. If any of the parameters on the list have generic names generic name can be used instead otherwise specific (or create generic name) may be used.

3SAO. For each line in the generic parameter name section, provide the specific parameter name. This is the name that is passed to the EMS in the DMsDeviceParams set (or the individual attributes if 'Pass To EMS Type' is set to INDIVIDUAL). The order of this section preferably be the same as the generic section above.

4SAO. The next step defines the parameters that are generally required for this SERVICE/ACTION. If they are not present in the service component and no default is provided the Domain Manager reports an error to iSAC. Required parameters are the only parameters that you can give defaults for. To build this section one can choose preferably only from the generic parameter name section.

5SAO. At this step defaults can be provided for any of the required parameters above. The parameter name generally comes from the set built in step 4SAO. The value preferably be the generic value if one exists, or the specific if a generic value does not exist.

6SAO. The next two steps allow to map generic values to specific values on a parameter by parameter basis. In the first section of this step enumerate the generic values in the form of <ParameterName>-<Value>. The parameter name preferably be chosen from the generic set defined in step 1SAO. In the second section of this step can provide a one-to-one mapping from the entries in the first set to the EMS specific value, so order is important again.

7SAO. The above step works well for mapping fixed value ranges but there are cases where more complex value translations are required. In these cases generally can provide a value mapping event (VME) that is called by the DM to allow additional mapping. With any event name it may be best to include the manager to identify the event uniquely.

8SAO. This atomic behavior event is an EMS event that the Domain Manager calls to activate this SERVICE and ACTION. This event call is across Interface C and preferably conform to the details of that interface.

9SAO. Domain Manager can pass one of two types of data across interface C to the EMS; sets of parameters and values, or individual parameter attributes. The next step tells the DM which one to pass. If this section is not provided the DM defaults to SETS (DMsDeviceParams and DMsDeviceParamValues) which is the preferred long term direction. If INDIVIDUAL is provided the DM iterates through its set of parameters and sets them as attributes in memory before calling the EMS. In the individual case the parameter names specified in the set of specific parameters generally should have attributes created for them.

10SAO. The next two sections of this step for an Atomic Service Activation Object used for rollback purposes. In order for rollback to work preferably provide the name of an event to call to get the existing service parameters and values, and the name of another Service Activation Object that represents the rollback behavior. The existing service event finds the inventory MO using the parameters it has and pulls out the DeviceParams and DeviceParamValues set from the MO. It is important to note that the rollback Service Activation Object can be the same Service Activation Object.

11SAO. A Multi-Step Service Activation Object is used when a SERVICE/ACTION requires more than one EMS event to be called in a sequence. The top level (e.g. generic SERVICE and ACTION) Service Activation Object exists only to define the sequence of Sub Service Activation Objects (all atomic for example). When the Domain Manager identifies a multi-step Service Activation Object it then breaks this object down into its sub Service Activation Objects and works on them. Because of the limited role that the actual Multi-Step Behavior Object performs, preferably one would only need to do step one from the Atomic Behavior Object and the additional step of defining the Sub Service Activation Objects.

1SUB. Do step 1SAO from Atomic Service Activation Object procedure described above.

2SUB. Define the sequence of sub Service Activation Objects that make up this SERVICE/ACTION.

The order that the sub Service Activation Objects are defined in is the order in which they are examined and eventually the order they are sent to the EMS. Preferably avoid the use of the same Service Activation Object name for a Sub Service Activation Object, since it can lead to a runtime error.

12SAO. A Logical Service Activation Object is used when a SERVICE/ACTION requires a decision to determine what should be done. An example of such a decision is the 'smart' MOD decision diagram. The Domain Manager calls the logic event defined in the "Logic Event" section to make the decision and the logic event returns the name of a Service Activation Object(s) that represents the result of the decision. The specifications of a logic event are described in the Logic Events section. The procedure for creating a logical Service Activation Object is as follows:

1LSAO. Do steps 1SAO through 7SAO from the Atomic Service Activation Object procedure, but only include the parameters and mappings required by the logic event to make the decision. For example, "smart" MOD requires TID and Id to find the Termination Point MO in the MIB to determine if the termination point exists on the particular network element, so these are the only parameters that the Logical Service Activation Object should include.

2LSAO. Provide the name of the logic event that the Domain Manager should call to make the decision.

The three types of Service Activation Objects described above can be used in a variety of combinations to form simple or complex object diagrams that model the behavior of the EMS domain. Because the top level SERVICE/ACTION names are fixed by the front end system, one needs to come up with new SERVICE (and possibly ACTION) names to represent the lower level Service Activation Objects. Generally there are no naming conventions for these lower level Service Activation Objects other than those imposed by the logic events. One thing to look out for when creating more complex object diagrams is to avoid loops in the diagram. All object diagrams preferably must eventually work their way down from the top level SERVICE/ACTION into one or more Atomic Service Activation Objects.

A low-level overview of the components of Service Activation Objects, along with their specific service and action combinations is illustrated next. A table containing Service Activation Object names and a logical hierarchy/network view are supplied for the device specified. In one embodiment of the present invention, the DM/EMS service activation rule-set supports a variety of service and action combinations (SERVICE/ACTION), including: DS3TPConfig/ADD; DS3TPConfig/DEL; DS3TPConfig/MOD; DS3TPConfigRec/DEL; DS3TPConfigRec/MOD; DS3TPAlarms/ADD; DS3TPAlarms/DEL; EC1TPConfig/ADD; EC1TPConfig/DEL; and EC1TPConfig/MOD.

The following is a table containing a list of all of exemplary Service Activation Objects, behavior events, and logic events included within the specified device's DM rule-set employed in one embodiment of the present invention. Also included is the type of Service Activation Object and the name of the rollback object. Table lists the service activation Service Activation Objects used in the DM/EMS rule-set in the present illustrative example.

| Service Activation Object Name | Type | Rollback Object |
|---|---|---|
| STS48TPAlarms_DEL | Atomic: NEC2400PrvR102.DM_N2400ProvTP | STS48TPAlarms_ADD |
| STS48TPAlarms_ADD | Atomic: NEC2400PrvR102.DM_N2400ProvTP | STS48TPAlarms_DEL |
| STS12TPConfigSMOD_MOD | Atomic: NEC2400PrvR102.DM_N2400ProvTP | STS12TPConfig SMOD_MOD |
| SMODTPInCRS_FAIL | Atomic: DM_TransportBehave. | N/A |

| Service Activation Object Name | Type | Rollback Object |
|---|---|---|
| BehaveSuccess_PASS | behaveFailure Atomic: DM_TransportBehave. behaveSuccess | N/A |
| DS3TPSMOD_REC | Multi-step | N/A |
| DS3TPConfigSub_MOD | Logical DM_TransportMgr. smart TPMOD | N/A |

Figure 15:
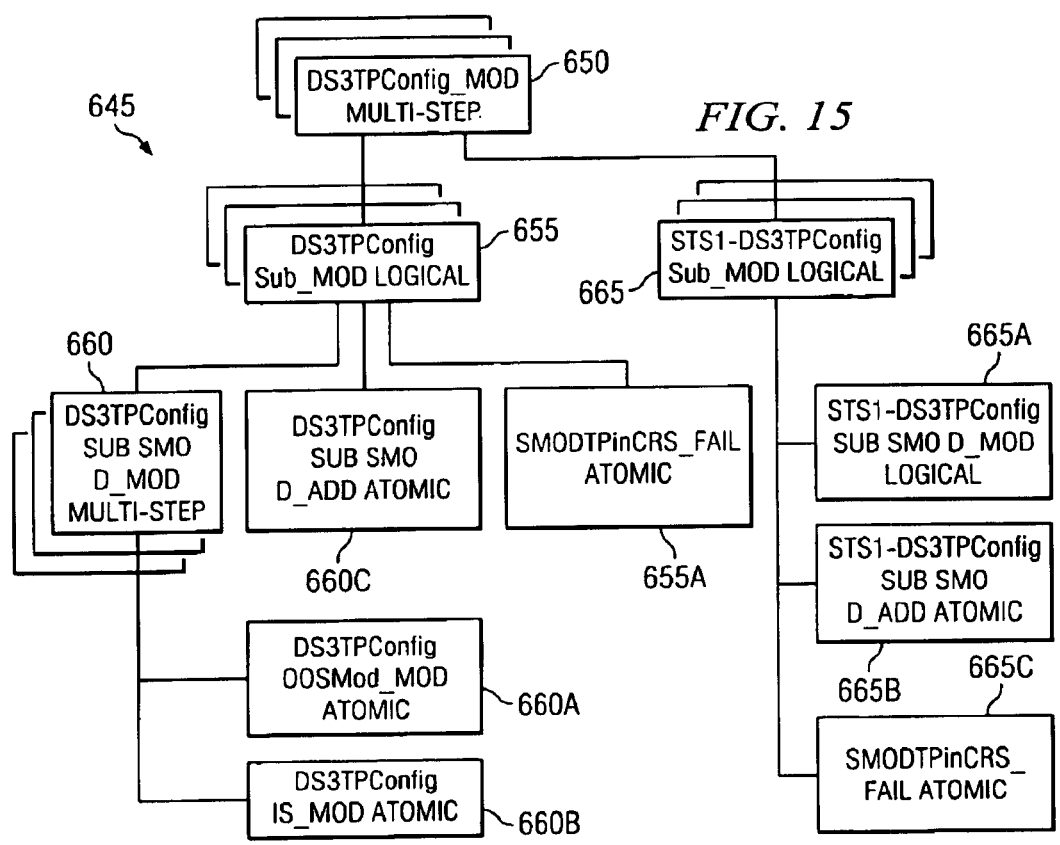
FIG. 15 shows an Object Network(ON) view for an example of a DS3 service activation Object Network based on the service modeling method of FIG. 14.

FIG. 15 shows an Object Network(ON) view for an example of a DS3 service (shown below) activation Object Network based on the service modeling method of FIG. 14.

Message Type=SUBMIT_SO
Transaction No=OSI-1
ISAC_Order_Begin
ORDER=ISAC-1
TIMESTAMP=1999/01/15 15:00:00
ACTION=NEW
DATE=0000/00/00 00:00:00
CRITICAL_DATE=1999/01/25 00:00:00
OPERATOR=OSI
ROLLBACKPOLICY=AUTOMATIC
ISAC_End_Order_Header
ISAC_Component_Begin
ID=1
SERVICE=DS3TPConfig
ACTION=MOD
NETWORKID=NECADM01
PREDECESSOR=
ROLLBACK=
:Transport_Defintion_Begin
:Parameter:Id=T3-1-1-1-1
:Parameter: Framing=UNFR
:Parameter: LBO=400
:Parameter: Xpolarity=0
:Transport_Definition_End
ISAC_Component_End
ISAC_Order_End
Message_End The above example preferably uses following steps:

1A. Order entered

2A. Upon completion design, electronic Service Order issued to Order DB (via gateway or SQL)

3A. iSAC queries Order DB for configurable # of orders

4A. Order is decomposed into component(s)

5A. Components routed to appropriate Domain Manager (s).

6A. Domain Manager translates generic component into EMS specific parameters which are routed to EMS.

7A. EMS specific events send NE activation commands to device to put up/out of service.

8A. Successful/Error responses sent back through system to Interface A

The illustrated simple example can employ a variety of interface A message types including: Submit/Cancel/Update/Closeout Service Order; Hold/Resume Service Order, Get Service Order Status; Service Order Status; Suspend/Resume Service Order Submission; Keep Alive; Keep Alive Response; Get Last Service Order; Last Service Order, Get Open Service Orders; Acknowledgments/Negative Acknowledgments.

In Transport and Loop network technology domain a variety of service/actions may be performed employing one embodiment of the present invention. For example, in the case of SONET ADM (Add Drop Multiplexer) a plurality of appropriate service/actions may be employed, including:

a1. Configure device supported termination points.

b1. Enable/disable alarms on device supported termination points.

c1. Point-to-point through or drop cross-connection.

d1. Drop and continue cross-connections.

e1. One-way broadcast cross-connections.

Likewise, in the case of DCS a variety of service/actions may be employed, including:

a2. Configure device supported termination points.

b2. Enable/disable alarms on device supported termination points.

c2. Two way cross-connections on supported termination points.

d2. One way broadcast cross connection on supported termination points.

e2. Bridge and roll support.

Similarly, in the case of DLC (Digital Loop Carrier) a plurality of service/actions may be employed, including:

a3. Configure and activate Line Unit Cards for POTS/COIN line.

b3. A s sign Call Reference Values(CRV) to lines.

c3. Configure and activate feeder to distribution static DS0 and DS1 cross connections.

In network Wireline/Mobile technology domain a variety of service/actions may be performed employing one embodiment of the present invention. For example, in the case of Lineside appropriate service/actions may be employed, including:

a4. Add, delete, modify Residential, Centrex, PBX, and Hunt Group lines.

b4. Add, Delete, Modify Residential, Centrex, PBX and Hunt Group line settings and features.

Likewise, in the case of Trunkside different appropriate service/actions may be employed, including:

a5. Add, delete, modify Trunk (IMT, DID, DOD, Announcement Trunks, DAL, PRA, E911, EANT).

b5. Add, delete, modify Trunk/Hunt group members.

c5. Add, delete, modify RTI and associated percentage quotas and Time of Day routing.

Similarly, in the case of HLR various appropriate service/actions may be employed, including:

a6. Add Mobile Subscriber.

b6. Modify Mobile Subscriber.

c6. Activate/Deactivate Mobile Subscriber.

d6. Add, Delete, Modify Mobile Number.

e6. Add, Delete, Modify Mobile Number Features.

In network Data technology domain a variety of service/actions may be performed employing one embodiment of the present invention. For example, in the case of UNI many appropriate service/actions may be employed, including:

a7. Add, delete, modify ATM UNI.

b7. Add, delete, modify FR UNI.

Similarly, in the case of Fast Packet Switching a variety of service/actions may be employed, including:

a8. Add, delete, modify Virtual Channel, Virtual Path and Frame relay SPVC.

b8. Add, delete, modify Virtual Channel, Virtual Path and Frame Relay Cross Connects.

c8. Add, delete, modify circuit and port profiles.

With continuing reference to FIG. 15, it displays a Network view for each Service Activation Object and its associated relationships to other Service Activation Objects for the DM/EMS service activation example of the DS3 service. The network view 645 of the Object Network DS3TPConfig—MOD 650 for a DS3 service is a multi-step "smart MOD" operation that modifies or creates both DS3 termination points and supporting STS1 termination points as required by the NE. The DS3TPConfigSub_MOD 655 Service Activation Object is the first step of the multi-step. This Service Activation Object uses the TDM standard logic event—smartTPMOD. If the TP is in a CRS (Cross-connect, SMODTPinCRS behavior is activated which results in a failure SMODTPInCRS_FAIL 655A. If the TP Managed Object exists, the multi-step DS3TPConfigSubSMOD_ MOD 660 behavior is activated utilizing in sequence Service Activation Objects DS3TPConfigOOSMod_MOD 660A (modifing parameters of the tern point and placing it OOS), and DS3TPConfigIS_MOD 660B (placing the term point back in service). Correctly mapped parameters are set and the EMS behavior event DM_N2400ProvTP is generated to perform the ED-T3 command to the device and modify the MIB.

If the TP does not exist, behavior described by DS3TPConfigSubSMOD_ADD 660C is enacted, also generating DM_N2400ProvTP behavior event to perform the ENT-T3 command to the device and populate the MIB. Both atomic Service Activation Objects DS3TPConfigOOSMod_MOD and DS3TPConfigSubSMOD_ADD utilize a value mapping event (VME), DM_$_N$2400_DS3_LBO_VME_OOS and DM_N2400_DS3_LBO_VME to correctly map the values of LBO to NE terms.

STS1-DS3TPConfigSub_MOD 665 Service Activation Object is the second step of the multi-step sequence. This Service Activation Object utilizes the VME DM_N2400_ STS1-DS3AID_VME to form the AID of the corresponding STS1 TP. The Service Activation Object uses the TDM standard logic event—smartTPMOD.

If the TP Managed Object exists STS1-DS3TPConfigSubSMOD_MOD 665A behavior is activated, and if the TP Managed Object does not currently exist STS1-DS3TPConfigSubSMOD_ADD 665B behavior is activated. Both of the above mentioned Service Activation Objects also utilize the VME-DM_N2400_STS1-DS3AID_VME. Correctly mapped parameters is set and the EMS behavior event DM_N2400ProvTP is generated, performing an ED-STS1 (MOD) and ENT-STS1 (ADD) command to the device and modifying the MIB. If the TP is in a CRS SMODTPinCRS behavior is activated which results in a failure SMODTPInCRS_FAIL 665C.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for activating a service in a network, the method comprising:
   (a) receiving a service order having one or more service components with each component being in a generic service request format;
   (b) routing each of the one or more service components to an appropriate domain manager;
   (c) translating the service component in each appropriate domain manager into corresponding device specific parameters; and
   (d) activating network elements responsive to the device specific parameters in order to activate the network service,
   wherein the generic service request format is generic to a plurality of services having a plurality of vendors or version numbers.

2. The method of claim 1, wherein the act of routing each of the one or more service components to an appropriate domain manager includes (1) parsing the service order into the one or more service components, and (2) identifying for each service component a corresponding domain manager based on parameters within the service component.

3. The method of claim 1, wherein each service component has a predetermined set of generic parameters, the act of translating the service component includes the acts of (1) mapping the service activation request into specific element transactions, (2) decomposing at least one of the service component components into element activation requests using object networks comprising service activation objects, (3) converting a device neutral generic service component into device specific terminology, and (4) composing commands based on a command template stored in the service activation object.

4. The method of claim 1, wherein a service component can represent a single service in one vendor's domain and multiple services in another vendor's domain.

5. The method of claim 1, wherein the act of translating the service component includes the acts of providing default and validation support.

6. The method of claim 1, wherein the act of mapping the service activation request into specific element transactions employs parameter names and values.

7. The method of claim 1, wherein the act of decomposing a universal service into specific services or commands supported by the network provides a method of finding an appropriate object network for the service activation request.

8. The method of claim 1, wherein the act of decomposing a universal service into specific services or commands supported by the network allows for network views of the appropriate object network.

9. The method of claim 1, wherein the act of command composing allows more vendor specific details to be encoded in the object network resulting in a simpler element management system.

10. The method of claim 1, wherein the act of activating network elements responsive to the device specific parameters in order to activate the network service includes (1)

interpreting the high level commands contained in the received component data, and (2) sending the translated commands to a destination network element in a device specific syntax through corresponding element management system by referencing an appropriate object network.

11. The method of claim 1, further comprising an act of rolling back an implemented service order by combining object networks and developing new object relationships if the change is canceled.

12. The method of claim 1, further comprising an act of rolling back an implemented service order by combining object networks and developing new object relationships if the change is unsuccessfully implemented.

13. The method of claim 1, further comprising an act of recovering by trying another service, after an initial activation attempt fails by combining object networks and developing new object relationships.

14. The method of claim 1, further comprising an act of recovering by trying another combination of services, after an initial activation attempt fails by combining object networks and developing new object relationships.

15. The method of claim 1, further comprising an act of scheduling by defining orders and components with scheduled date parameters.

16. The method of claim 1, further comprising an act of dependency resolution by combining service components in a service order and entering associated dependencies.

17. The method of claim 1, further comprising an act of service activation and service modeling that uses object networks based activation and translation to support generic inputs instead of device specific inputs by employing a set of templates to enable generic description of a service order.

18. The method of claim 1, further comprising the acts of (1) service activation, and (2) service modeling using object networks that provide for service evolution.

19. The method of claim 1, further comprising the acts of (1) building vendor/device specific service activation object networks that can have behavior modified at run time without resetting a service activation system.

20. The method of claim 3, wherein the object network can persist the service translations.

21. The method of claim 3, wherein a plurality of possibilities can exist for modeling detailed decomposition scenarios by applying object networks based service modeling using service activation objects of the type including atomic, multi-step, and logical.

22. The method of claim 10, wherein the act of referencing the appropriate object network for a service and action for a specific network element employs a particular parameter.

23. The method of claim 10, wherein the act of referencing the appropriate object network for a service and action for a specific network element employs a family of devices to which the network element belongs.

24. A service activation system for activating a service on a target network, comprising:
  (a) an order processing system for receiving a service order having one or more generic service components;
  (b) at least one domain manager communicatively connected to the order processing system for receiving the service order, wherein the order processing system is adapted to route the one or more generic service components to an appropriate domain manager of the at least one domain manager and the domain manager translates said generic service component into corresponding device specific parameters; and
  (c) at least one element management system communicatively connected to at least one domain manager for receiving the device specific parameters in order to activate the service on the target network,
  wherein the generic service components are generic to a plurality of services having a plurality of vendors or version numbers.

25. The system of claim 24, further comprising at least one peer manager communicatively connected to the at least one domain manager to route the one or more generic service components to an appropriate domain manager of the at least one domain manager, wherein the one or more generic service components are being received from the at least one order processing system having one or more order processors communicatively connected to said peer manager.

26. The system of claim 24, further comprising at least one gateway as an interface to said service activation system for receiving a service activation request one or more service provisioning systems.

27. The system of claim 24, further comprising at least one order repository for storing network model and service activation related information including service activation objects that are initiated from the derived executing said generic service order components.

28. The system of claim 24, further comprising at least one processing engine in the said gateway for (1) sending and receiving messages, and (2) parsing managed network element responses.

29. A service activation system for activating a service on a target network management system or other information management system with universal or generic informational changes entered in one or more service provisioning systems, the system comprising:
  (a) an activation system further comprising:
    an order processing system communicatively interconnected between said service provisioning systems and
    at least one domain manager communicatively connected to the order processing system for receiving a service order comprising at least one generic service component, wherein the at least one domain manager translates said at least one generic service component into corresponding device specific parameters, and the order processing system is adapted to route the at least one generic service component to an appropriate domain manager of the at least one domain manager,
    one or more peer managers communicatively connected to the at least one domain manager to route the at least one generic service component to an appropriate domain manager of the at least one domain manager, wherein the at least one generic service component is received from the order processing system, wherein each of said at least one domain manager includes at least one element management system communicatively connected to the at least one domain manager for receiving the device specific parameters in order to activate the service on the target network; and
  (b) at least one gateway as an interface to the service provisioning systems, communicatively connected to said service provisioning system for receiving a service activation request, wherein said gateway includes a processing engine for
    (1) sending and receiving messages, and
    (2) identifying service order and component data for population into order database tables,
  wherein the at least one generic service component is generic to a plurality of services having a plurality of vendors or version numbers.

30. The service activation system of claim 29, wherein the order processing system further comprising:
one or more order processors;
an order repository; and
one or more messaging interfaces,
wherein the order processing system is communicatively interconnected between said service provisioning systems and said domain managers via events or said peer managers and the order processing system includes a rule engine for performing tasks including advanced processing of service activation objects that are initiated from the derived service order components as determined in the gateway defined by at least one user employing said service provisioning systems.

31. The service activation system of claim 29, wherein the order processing system
processes service responsive to the service order parameters;
processes objects to carry out the predefined policies for activating services on the network responsive to the particular incoming generic component activation requests;
manages the element, network, service, and business layers; and
determines using an aggregate of element and network service request messages, how to activate the requested service on the physical managed network element;
employs at least one of said peer manager to communicate with said domain managers and said element management systems;
uses generic rule sets to submit component activation request, request closure, request the component activation to be rolled back or reversed, and request component activation status; and
performs the service management functions, inventory management, and distribution of service orders to domain managers managing their respective destination network elements via element management systems.

32. The service activation system of claim 29, the order processing system further comprising:
a plurality of graphical user interfaces facilitating access to said order processing system, wherein user interface may be any suitable device such as a display terminal for providing users with interactive access to the order processing system.

33. The service activation system of claim 29, wherein the domain manager
receives generic component activation requests from the order processing system and maps the activation request into specific element transactions through the use of service activation objects stored in a database;
translates vendor neutral generic service components into vendor specific terminology by interpreting the high level commands contained in the received component data and sends the translated commands to a destination network element in a device specific syntax through corresponding element management systems;
decomposes the generic service component into element activation requests using object networks and routes vendor specific parameters to the appropriate element management system by referencing at least one of the object networks for a service and action for a specific network element using a particular parameter;
provides a means to rollback an implemented change if the change is canceled or unsuccessfully implemented by combining object networks and developing new object relationships;
provides a means to perform scheduling and dependency resolution by population of date and predecessors parameters; and
provides a means for recovery or trying another service or combination of services, after an initial activation attempt has failed by combining object networks and developing new object relationships.

34. The system of claim 29, further comprising an user interface operably connected to the gateway and the activation system, for displaying to a user status and alert information.

35. The system of claim 29, wherein the gateway comprises a plurality of distributed gateways.

36. A memory device having instructions that when loaded into and executed by at least one computer implements the service activation system of claim 29.

37. The system of claim 29, further comprising a service builder editor operably connected to the order repository of the order processing system.

38. The system of claim 29, wherein the service activation system comprises means for tracking of the use and availability of managed network elements.

39. The system of claim 29, wherein the service activation system comprises means for provisioning service orders for network resources.

40. The system of claim 29, wherein the service activation system comprises means for scheduling activities related to completion of service orders.

41. The system of claim 29, wherein the service activation system comprises means for creating a network design.

42. The system of claim 29, wherein the service activation system comprises means for automatically performing service and actions on network element inventory to satisfy a service order request.

43. The system of claim 29, wherein the service activation system is a component of an operations support system.

44. A service activation system for activating a service on a target network management system or other information management system with universal informational changes entered in one or more service provisioning systems, the system comprising:
means for describing a service by one or more universal service components using universal service component relationships stored in a database;
means for translating a service by employing universal service translation including parameter mapping, service decomposition, and command composition, wherein said means for translating comprises means for translating a vendor neutral one of said one or more universal service components into vendor specific form and means for translating a device neutral one of said one or more universal service components into device specific form; and
means for activating a service by applying service modeling using object networks including atomic, multi-step, and logical objects,
wherein the one or more universal service components are generic to a plurality of services having a plurality of vendors or version numbers.

45. The system of claim 44, wherein the means for describing a service comprises:
means for populating a service into said one or more service provisioning systems using said one or more universal service components;

means for grouping said one or more universal service component instances together to compose a service order; and means for spawning of the desired service order design to an activation system through a messaging interface.

46. The system of claim 44, wherein the means for translating a service comprises:

means for processing of a service order by the activation system;

means for routing said one or more universal service components to an appropriate domain managers;

means for decomposing said one or more universal service components into element activation requests using object networks;

means for routing vendor specific parameters to the appropriate element management systems; and means for routing location specific parameters to the appropriate element management systems.

47. The system of claim 44, wherein the means for activating a service comprises:

means for initiating vendor specific events, delivering activation commands or data to network elements through an appropriate element management system to enable the desired service;

means for initialing device specific events, delivering activation commands or data to network elements through an appropriate element management system to enable the desired service; and means for sending status responses through the activation system and said messaging interface to the appropriate service provisioning system.

48. A universal service activation system comprising:

means for populating into a service provisioning system one or more universal service components, wherein said one or more universal service components each provide a vendor neutral and device neutral definition of a service;

means for grouping said universal service component instances together to compose a service order;

means for spawning of the desired service order design to an activation system through at least one messaging interface;

means for processing of a service order by the activation system;

means for routing said universal service components to an appropriate domain manager;

means for translating said universal service components into vendor specific format;

means for translating said universal service components into device specific format;

means for decomposing said universal service components into element activation requests using object networks;

means for routing vendor specific parameters to an appropriate element management system;

means for routing location specific parameters to an appropriate element management system;

means for initiating vendor specific events, delivering activation commands or data to network elements through an appropriate element management system to enable the desired service;

means for initiating device specific events, delivering activation commands or data to network elements through an appropriate element management system to enable the desired service; and means for sending status responses through the activation system and an appropriate messaging interface to the appropriate one or more service provisioning systems, wherein the one or more universal service components are generic to a plurality of services having a plurality of vendors or version numbers.

49. A computer-implemented method for universal service activation comprising:

describing a service in a universal service component;

including one or more of said universal service components in a service order;

processing said service order by an activation system:

routing said one or more of said universal service components included in said service order to an appropriate domain manager, said appropriate domain manager translating vendor neutral universal service components into vendor specific form and translating device neutral universal service components into device specific form; and activating said service described by said one or more universal service components in said service order, wherein the one or more universal service components are generic to a plurality of services having a plurality of vendors or version numbers.

50. A computer-implemented method for service description process of claim 49 further comprising:

populating a service into a service provisioning system using one or more universal service components;

grouping said universal service component instances together to compose a service order; and spawning of the desired service order design to an activation system through a messaging interface.

51. A computer-implemented method for service translation process of claim 49 further comprising:

decomposing said universal service component into element activation requests using object networks;

routing vendor specific parameters to the appropriate element management system; and routing location specific parameters to the appropriate element management system.

52. A computer-implemented method for service activation process of claim 49 further comprising:

initiating vendor specific events, delivering activation commands or data to network elements through an element management system to enable the desired service;

initiating device specific events, delivering activation commands or data to network elements through an element management system to enable the desired service; and sending status responses through the activation system and the appropriate messaging interface to the appropriate service provisioning system.

53. A computer-implemented method for universal service activation comprising:

populating into one or more service provisioning system one or more generic service components;

grouping said generic service components together to compose a service order;

spawning of the desired service order design to an activation system through a messaging interface;

processing of a service order by the activation system;

routing said generic service components to an appropriate domain manager; translating vendor neutral generic service components into vendor specific terminology;

translating device neutral generic service components into device specific terminology;

decomposing said generic service components into element activation requests using object networks;

routing vendor specific parameters to an appropriate element management system;

routing location specific parameters to an appropriate element management system;

initiating vendor specific events;

delivering activation commands or data to network elements through an element management system to enable the desired service;

initiating device specific events;

delivering activation commands or data to network elements through an element management system to enable the desired service; and sending status responses through the activation system and the appropriate messaging interface to the appropriate service provisioning system, wherein the generic service components are generic to a plurality of services having a plurality of vendors or version numbers.

54. A service activation system for activating a service on a target network, comprising:

(a) an order processing system for receiving a service order having one or more generic service components defining a service in device neutral parameters;

(b) at least one domain manager communicatively connected to the order processing system for receiving the service order, wherein the order processing system is adapted to route the one or more generic service components to an appropriate domain manager of the at least one domain manager and the domain manager translates said generic service component into corresponding device specific parameters;

(c) at least one element management system communicatively connected to at least one domain manager for receiving the device specific parameters in order to activate the service on the target network; and (d) at least one connection into an order database for receiving a service activation request one or more service provisioning systems, wherein the generic service components are generic to a plurality of services having a plurality of vendors or version numbers.

55. A service activation system for activating a service on a target network, comprising:

(a) an order processing system for receiving a service order having one or more generic service components defining a service in device neutral parameters;

(b) at least one domain manager communicatively connected to the order processing system for receiving the service order, wherein the order processing system is adapted to route the one or more generic service components to an appropriate domain manager of the at least one domain manager and the domain manager translates said generic service component into corresponding device specific parameters; and (c) at least one network management system communicatively connected to at least one domain manager for receiving the device specific parameters in order to activate the service on the target network, wherein the generic service components are generic to a plurality of services having a plurality of vendors or version numbers.

56. The system of claim 55, further comprising at least one peer manager communicatively connected to the at least one domain manager to route the one or more generic service components to an appropriate domain manager of the at least one domain manager, wherein the one or more generic service components are being received from the at least one order processing system having one or more order processors communicatively connected to said peer manager.

57. The system of claim 55, further comprising at least one gateway as an interface to said service activation system for receiving a service activation request one or more service provisioning systems.

58. The system of claim 55, further comprising at least one order repository for storing network model and service activation related information including service activation objects that are initiated from the derived executing said generic service order components.

59. The system of claim 55, further comprising at least one processing engine in the said gateway for (1) sending and receiving messages, and (2) parsing managed network element responses.

60. The system of claim 55, further comprising at least one connection into an order database for receiving a service activation request one or more service provisioning systems.

61. A service activation system for activating a service on a target network management system or other information management system with universal or generic informational changes entered in one or more service provisioning systems, the system comprising:

(a) an activation system further comprising:

an order processing system communicatively interconnected between said service provisioning systems and at least one domain manager communicatively connected to the order processing system for receiving a service order comprising at least one generic service component, wherein the at least one domain manager translates said at least one generic service component into corresponding device specific parameters, and the order processing system is adapted to route the at least one generic service component to an appropriate domain manager of the at least one domain manager, one or more peer managers communicatively connected to the at least one domain manager to route the at least one generic service component to an appropriate domain manager of the at least one domain manager, wherein the at least one generic service component is received from the order processing system, wherein each of said at least one domain manager includes at least one network management system communicatively connected to the at least one domain manager for receiving the device specific parameters in order to activate the service on the target network; and (b) at least one gateway as an interface to the service provisioning systems, communicatively connected to said service provisioning system for receiving a service activation request, wherein said gateway includes a processing engine for (1) sending and receiving messages, and (2) identifying service order and component data for population into order database tables, wherein the at least one generic service component is generic to a plurality of services having a plurality of vendors or version numbers.

62. The service activation system of claim 61, wherein the order processing system further comprising:

one or more order processors;

an order repository; and one or more messaging interfaces, wherein the order processing system is communicatively interconnected between said service provisioning systems and said domain managers via events or said peer managers and the order processing system includes a rule engine for performing tasks including advanced processing of service activation objects that are initiated from the derived service order components as determined in the gateway defined by at least one user employing said service provisioning systems.

63. The service activation system of claim 61, wherein the order processing system:

processes service responsive to the service order parameters;

processes objects to carry out the predefined policies for activating services on the network responsive to the particular incoming generic component activation requests;

manages the element, network, service, and business layers;

determines using an aggregate of element and network service request messages, how to activate the requested service on the physical managed network element;

employs at least one of said peer manager to communicate with said domain managers and said element management systems;

uses generic rule sets to submit component activation request, request closure, request the component activation to be rolled back or reversed, and request component activation status; and performs the service management functions, inventory management, and distribution of service orders to domain managers managing their respective destination network elements via element management systems.

64. The service activation system of claim 61, the order processing system further comprising:

a plurality of graphical user interfaces facilitating access to said order processing system, wherein user interface may be any suitable device such as a display terminal for providing users with interactive access to the order processing system.

65. The service activation system of claim 61, wherein the domain manager:

receives generic component activation requests from order processing system and maps the activation request into specific element transactions through the use of service activation objects stored in a database;

translates vendor neutral generic service components into vendor specific terminology by interpreting the high level commands contained in the received component data and sends the translated commands to a destination network element in a device specific syntax through corresponding element management systems;

decomposes generic service component into element activation requests using object networks and routes vendor specific parameters to the appropriate element management system by referencing object network for a service and action for a specific network element using a particular parameter;

provides a means to rollback an implemented change if the change is canceled or unsuccessfully implemented by combining object networks and developing new object relationships;

provides a means to perform scheduling and dependency resolution by population of date and predecessors parameters; and provides a means for recovery or trying another service or combination of services, after an initial activation attempt has failed by combining object networks and developing new object relationships.

66. The system of claim 61, further comprising an user interface operably connected to the gateway and the activation system for displaying to a user status and alert information.

67. The system of claim 61, wherein the gateway comprises a plurality of distributed gateways.

68. A memory device having instructions that when loaded into and executed by at least one computer implements the service activation system of claim 61.

69. The system of claim 61, further comprising a service builder editor operably connected to the order repository of the order processing system.

70. The system of claim 61, wherein the service activation system comprises means for tracking of the use and availability of managed network elements.

71. The system of claim 61, wherein the service activation system comprises means for provisioning service orders for network resources.

72. The system of claim 61, wherein the service activation system comprises means for scheduling activities related to completion of service orders.

73. The system of claim 61, wherein the service activation system comprises means for creating a network design.

74. The system of claim 61, wherein the service activation system comprises means for automatically performing service and actions on network element inventory to satisfy a service order request.

75. The system of claim 61, wherein the service activation system is a component of an operations support system.

* * * * *